US011455910B2

(12) United States Patent
Bailey et al.

(10) Patent No.: US 11,455,910 B2
(45) Date of Patent: Sep. 27, 2022

(54) BRAILLE CELL AND ASSOCIATED PIN SUPPORT AND PIN ACTUATION ASSEMBLIES

(71) Applicant: TECHNOLOGIES HUMANWARE INC., Drummondville (CA)

(72) Inventors: Matthew Bailey, Ottawa (CA); Kevin Bailey, Ottawa (CA); James Henderson, Ottawa (CA); Bennet Heidenreich, Ottawa (CA); Peter Cottreau, Ottawa (CA); Steve Harrington, Ottawa (CA); Jaime Yu, Ottawa (CA); Georges Bourque, Longueuil (CA)

(73) Assignee: TECHNOLOGIES HUMANWARE INC., Drummondville (CA)

( * ) Notice: Subject to any disclaimer, the term of this patent is extended or adjusted under 35 U.S.C. 154(b) by 861 days.

(21) Appl. No.: 16/358,925

(22) Filed: Mar. 20, 2019

(65) Prior Publication Data

US 2019/0304340 A1    Oct. 3, 2019

Related U.S. Application Data

(60) Provisional application No. 62/649,668, filed on Mar. 29, 2018.

(51) Int. Cl.
*G09B 21/00* (2006.01)
*B41M 3/16* (2006.01)
*G09B 21/02* (2006.01)

(52) U.S. Cl.
CPC ............ *G09B 21/004* (2013.01); *B41M 3/16* (2013.01); *G09B 21/02* (2013.01)

(58) Field of Classification Search
CPC .... G09B 21/00; G09B 21/003; G09B 21/004; G09B 21/009; G09B 21/02; G09B 21/025
See application file for complete search history.

(56) References Cited

U.S. PATENT DOCUMENTS

| 4,283,178 A | * | 8/1981 | Tetzlaff | G09B 21/003 434/114 |
| 4,633,121 A | * | 12/1986 | Ogawa | G09B 21/003 434/114 |
| 5,165,897 A | * | 11/1992 | Johnson | G06F 3/011 601/84 |

(Continued)

*Primary Examiner* — Kurt Fernstrom
(74) *Attorney, Agent, or Firm* — Renner, Otto, Boisselle & Sklar, LLP

(57) ABSTRACT

A braille cell and associated braille pin support and pin actuation assemblies are disclosed. The braille cell can include a frame, braille pins movable up and down between raised and lowered positions, and a pin actuation assembly to individually move the pins. The braille cell can include support arms, each of which having a base end connected to the frame and a pin end connected to and following a motion of a respective pin between its raised and lowered positions. The pin actuation assembly can include pin actuation units, each having a motor with a rotatable motor shaft and multiple cams mounted on the shaft, each for selectively actuating a respective pin. Each pin actuation unit can also include an angular position sensing system for monitoring, for example magnetically, a passage of the shaft through a reference angular position, and deriving information about a current angular position of the shaft.

27 Claims, 16 Drawing Sheets

(56) References Cited

U.S. PATENT DOCUMENTS

| | | | | |
|---|---|---|---|---|
| 5,226,817 A | * | 7/1993 | Nakajima | G09B 21/004 |
| | | | | 434/117 |
| 5,426,837 A | * | 6/1995 | Tieman | G09B 21/003 |
| | | | | 29/25.35 |
| 5,449,292 A | * | 9/1995 | Tani | G09B 21/004 |
| | | | | 434/114 |
| 5,685,720 A | * | 11/1997 | Kashi | G09B 21/003 |
| | | | | 434/114 |
| 5,766,014 A | | 6/1998 | Ida et al. | |
| 5,842,867 A | * | 12/1998 | Hong | G09B 21/004 |
| | | | | 434/114 |
| 6,734,785 B2 | * | 5/2004 | Petersen | G09B 21/004 |
| | | | | 340/407.1 |
| 6,827,512 B1 | * | 12/2004 | Souluer | G09B 21/025 |
| | | | | 434/114 |
| 7,097,457 B2 | * | 8/2006 | Kajino | G09B 21/004 |
| | | | | 434/112 |
| 7,462,034 B1 | * | 12/2008 | Murphy | G09B 21/003 |
| | | | | 434/112 |
| 8,740,618 B2 | * | 6/2014 | Shaw | G09B 21/003 |
| | | | | 340/407.1 |
| 9,142,143 B2 | | 9/2015 | Chari | |
| 10,431,119 B2 | * | 10/2019 | Shah | G09B 21/004 |
| 10,540,909 B2 | * | 1/2020 | Murphy | G09B 21/02 |
| 11,164,480 B2 | * | 11/2021 | Guenther | G09B 21/004 |
| 2015/0262509 A1 | | 9/2015 | Labbe et al. | |
| 2015/0379895 A1 | | 12/2015 | Chari | |
| 2016/0034180 A1 | | 2/2016 | Labbe et al. | |

\* cited by examiner

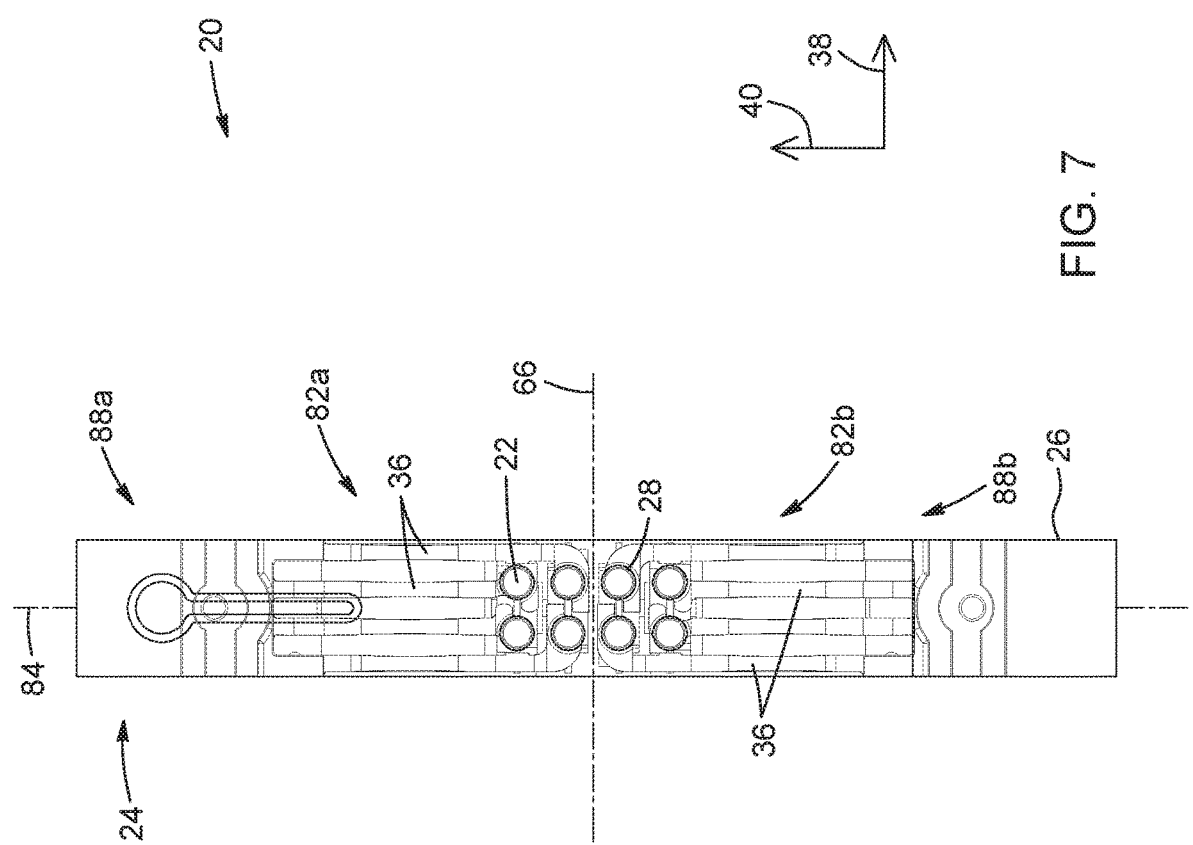

US 11,455,910 B2

BRAILLE CELL AND ASSOCIATED PIN SUPPORT AND PIN ACTUATION ASSEMBLIES

RELATED PATENT APPLICATION

The present application claims priority from U.S. Provisional Patent Application No. 62/649,668 filed on Mar. 29, 2018, the disclosure of which is incorporated herein by reference in its entirety.

TECHNICAL FIELD

The technical field generally relates to braille systems and devices for blind and visually impaired individuals, and particularly, to a braille cell including pin support and/or pin actuation assemblies, which can be used in a refreshable braille display.

BACKGROUND

Braille is used by blind and visually impaired individuals as a means of reading and writing text, and a wide range of devices and systems are available for these purposes. Such devices and systems include braille writers and readers for use as standalone units or in communication with other electronic devices, for example personal computers, tablet computers, smartphones, personal digital assistants, watches, graphical displays, and the like.

A braille display—also called a braille reader—is an electro-mechanical device capable of presenting braille data to a user. Examples of braille data include braille characters such as letters, numbers, punctuation marks, symbols, indicators; braille composition signs; and mathematical symbols. A braille display is often referred to as "refreshable" because it can change over time, either automatically or controllably, the braille data it displays to a user. Conventional refreshable braille displays generally include an array of one or more rows of adjacent braille cells. Each braille cell generally includes a plurality of actuated pins, for example eight pins arranged in a rectangular array of four rows and two columns. Each pin can be selectively raised and lowered to enable tactile braille reading by the user. By selectively moving the pins of a braille cell up and down using actuators—typically piezoelectric actuators—controlled by a controller, different combinations of projected and retracted pins can be formed, each representing a specific braille character. While existing braille displays have certain advantages, they are not without drawbacks and limitations. Challenges therefore remain in the field of braille cell design and actuation.

SUMMARY

The present description generally relates to braille cells for use in refreshable braille displays, and particularly to braille pin support and actuation techniques for selectively and individually moving braille pins up and down to form different combinations of raised and lowered pins, each combination representing a specific braille character to be displayed to a user.

In accordance with an aspect, there is provided a braille cell including:
  a frame including an upper cover having a plurality of apertures therein;
  a plurality of braille pins, each braille pin extending along a longitudinal pin axis and being engaged with a respective one of the apertures and movable therein along the longitudinal pin axis between a raised position and a lowered position thereof;
  a pin actuation assembly configured to move each braille pin between the raised position and the lowered position thereof; and
  a pin support assembly including a plurality of support arms holding the plurality of braille pins, each support arm having a base end connected to the frame and a pin end connected to and following a motion of a respective one of the braille pins as the respective braille pin is moved between the raised and lowered positions thereof by the pin actuation assembly.

In one embodiment, the plurality of support arms includes flexible cantilever arms.

In one embodiment, the support arms extend substantially parallel to one another.

In one embodiment, at least one of the support arms includes a curved portion. In one embodiment, the curved portion includes a convex upward curve. In one embodiment, the at least one of the support arms further includes a first substantially straight portion extending from the base end to a first end of the curved portion and a second substantially straight portion extending from a second end of the curved portion to the pin end. In one embodiment, the second substantially straight portion is transverse to the longitudinal pin axis of the respective braille pin.

In one embodiment, the upper cover further includes an outer face and an inner face between which the plurality of apertures extends, and the base end of each support arm is connected to the inner face.

In one embodiment, each braille pin has a top end, a bottom end, and a pin body extending therebetween along the longitudinal pin axis, and each support arm is connected to the pin body of the respective braille pin. In one embodiment, each support arm is connected to the pin body of the respective braille pin at a connection point closer to the top end than to the bottom end.

In one embodiment, the support arms are releasably connected to the frame.

In one embodiment, each support arm and the respective braille pin held thereby are integrally formed.

In one embodiment, the support arms are arranged in sets, the support arms in each set have the base ends thereof terminating in a common base portion connected to the frame, and each set of support arms and the respective braille pins held thereby together define one of a number of monolithic braille pin units.

In one embodiment, the monolithic braille pin units are releasably connected to the frame.

In one embodiment, the plurality of braille pins consists of eight braille pins arranged in a rectangular braille pin array of four rows parallel to a row axis and two columns parallel to a column axis, and the plurality of support arms consists of eight corresponding support arms. The four rows consist of a first row, a second row adjacent to the first row, a third row adjacent to the second row, and a fourth row adjacent to the third row. The plurality of support arms consists of a first set of four support arms holding the four braille pins of the first row and the second row, and a second set of four support arms holding the braille pins of the third row and the fourth row. The support arms of the first set have the base ends thereof terminating in a first common base portion connected to the frame. The support arms of the first set and the respective braille pins held thereby together define a first monolithic braille pin unit. The support arms of the second set have the base ends thereof terminating in a second common base portion connected to the frame. The support arms of the second set and the respective braille pins held thereby together define a second monolithic braille pin unit. In one embodiment, the support arms extend substantially parallel to the column axis.

In one embodiment, the first and second sets of support arms are disposed in a mirror-symmetrical arrangement to each other relative to a mirror plane perpendicular to the column axis and passing centrally through the braille pin array. In one embodiment, the first and second monolithic braille pin units are releasably connected to the frame. In one embodiment, in the first set of support arms, the support arms connected to the braille pins in the first row extend inwardly of the support arms connected to the braille pins in the second row with respect to a central plane perpendicular to the row axis and passing centrally between the two columns, and, in the second set of support arms, the support arms connected to the braille pins in the fourth row extend inwardly of the support arms connected to the braille pins in the third row with respect to the central plane perpendicular to the row axis and passing centrally between the two columns.

In one embodiment, the pin actuation assembly includes a pin actuation unit for actuating a subset of braille pins among the plurality of braille pins. Each pin actuation unit includes a motor having a motor shaft configured to rotate about a motor axis, and a set of cams mounted on the motor shaft. Each cam is engaged with a respective one of the braille pins in the respective set to selectively move the respective braille pin between the raised position and the lowered position thereof. The cams are oriented relative to one another so that upon rotation of the motor shaft the braille pins are sequentially raised and lowered into a series of distinct braille pin configurations. Each braille pin configuration represents a different arrangement of the braille pins in the raised and lowered positions thereof.

In one embodiment, the braille cell further includes an angular position sensing system configured to monitor a rotational motion of the motor shaft about the motor axis and generate an output signal indicative of a passage of the motor shaft through a reference angular position during the rotational motion thereof.

In one embodiment, the pin actuation units consist of four pin actuation units, and, for each pin actuation unit, the respective set of braille pins is a respective pair of braille pins, the respective set of cams consists of two cams, and the series of distinct braille pin configurations consists of four distinct braille pin configurations. In one embodiment, the four pin actuation units are arranged in a first stack of two pin actuation units and a second stack of two pin actuation units. In one embodiment, the motor is a stepper motor.

In one embodiment, the angular position sensing system includes a modulator configured to provide a modulated signal that varies as a function of a rotation angle of the motor shaft about the motor axis, and a receiver configured to receive the modulated signal. In one embodiment, the angular position sensing system includes a processor configured to receive the output signal from the receiver and determine therefrom a current angular position of the motor shaft.

In one embodiment, the modulator includes at least one magnet producing a spatially varying magnetic field as the modulated signal, and the receiver includes a magnetic field sensor sensing an intensity of the spatially varying magnetic field produced by the at least one magnet during at least part of the rotational motion of the motor shaft, and generating in response the output signal. In one embodiment, the reference angular position of the motor shaft corresponds to a position of closest approach between the at least one magnet and the magnetic field sensor.

In accordance with another aspect, there is provided a monolithic braille pin unit for use in a braille cell including a frame including an upper cover having a set of apertures therein, the monolithic braille pin unit including:
a set of braille pins, each braille pin extending along a longitudinal pin axis and being engageable with a respective one of the apertures and movable therein along the longitudinal pin axis between a raised position and a lowered position thereof;
a base portion configured for connection to the frame of the braille cell; and
a set of support arms holding the set of braille pins, each support arm having a base end connected to the base portion and a pin end connected to and following a motion of a respective one of the braille pins as the respective braille pin is moved between the raised and lowered positions thereof.

In one embodiment, the base portion is configured to be connected to an inner face of the upper cover of the frame.

In one embodiment, the base portion is configured to be releasably connected to the frame.

In one embodiment, the set of support arms includes flexible cantilever arms.

In one embodiment, the support arms extend substantially parallel to one another.

In one embodiment, at least one of the support arms includes a curved portion. In one embodiment, the curved portion includes a convex upward curve.

In one embodiment, each braille pin has a top end, a bottom end, and a pin body extending therebetween along the longitudinal pin axis, and each support arm is connected to the pin body of the respective braille pin.

In one embodiment, the set of braille pins consists of four braille pins arranged in a rectangular braille pin array of two rows parallel to a row axis and two columns parallel to a column axis, and the set of support arms consists of four corresponding support arms. In one embodiment, the support arms extend substantially parallel to the column axis.

In one embodiment, the braille pins and the support arms belong to more than one braille cell.

In accordance with another aspect, there is provided a pin actuation unit for actuating a set of braille pins, the pin actuation unit including:
a motor having a motor shaft configured to rotate about a motor axis;
a set of cams mounted on the motor shaft, each cam being engaged with a respective one of the braille pins to move the respective braille pin between a raised position and a lowered position thereof, the cams being oriented relative to one another so that upon rotation of the motor shaft the braille pins are sequentially raised and lowered into a series of distinct braille pin configurations, each braille pin configuration representing a different arrangement of the braille pins in the raised and lowered positions thereof; and
an angular position sensing system configured to monitor a rotational motion of the motor shaft about the motor axis and generate an output signal indicative of a passage of the motor shaft through a reference angular position during the rotational motion thereof.

In one embodiment, the set of cams consists of two cams and the series of distinct braille pin configurations consists of four distinct braille pin configurations.

In one embodiment, the two cams are oriented at right angle to each other on the motor shaft.

In one embodiment, the motor is a stepper motor.

In one embodiment, the angular position sensing system includes a modulator configured to provide a modulated signal that varies as a function of a rotation angle of the motor shaft about the motor axis, and a receiver configured to receive the modulated signal and produce therefrom the output signal.

In one embodiment, the angular position sensing system includes a processor configured to receive the output signal from the receiver and determine therefrom a current angular position of the motor shaft.

In one embodiment, the angular position sensing system includes a processor configured to receive the output signal from the receiver, determine therefrom information associated with a current angular position of the motor shaft, and transmit a processed signal conveying the information associated with the current angular position of the motor shaft to a motor controller coupled to the motor shaft and configured to control the rotational motion thereof. In one embodiment, the processor is configured to derive information associated with a current braille pin configuration of the set of braille pins among the series of distinct braille pin configurations based on the information associated with the current angular position of the motor shaft.

In one embodiment, the modulator is coupled to the motor shaft to rotate along with the motor shaft and with respect to the receiver.

In one embodiment, the modulator includes at least one magnet producing a spatially varying magnetic field as the modulated signal, and the receiver includes a magnetic field sensor configured to sense an intensity of the spatially varying magnetic field produced by the at least one magnet during at least part of the rotational motion of the motor shaft and to generate, in response, the output signal. In one embodiment, the reference angular position of the motor shaft corresponds to a position of closest approach between the at least one magnet and the magnetic field sensor. In one embodiment, each magnet is mounted to one of the cams in a radially offset relationship with the motor axis. In one embodiment, the at least one magnet consists of either a single magnet or a pair of magnets. In one embodiment, the at least one magnet consists of two magnets disposed in a diametrically opposed relationship with respect to the motor axis and with opposite poles facing each other. In one embodiment, the at least one magnet includes a permanent magnet. In one embodiment, the magnetic field sensor is a Hall effect sensor.

In accordance with another aspect, there is provided a braille cell including:
- a frame including an upper cover having a plurality of apertures therein;
- a plurality of braille pins, each braille pin extending along a longitudinal pin axis and being engaged with a respective one of the apertures and movable therein along the longitudinal pin axis between a raised position and a lowered position thereof; and
- a pin actuation assembly including pin actuation units, each pin actuation unit for actuating a respective set of braille pins among the plurality of braille pins, each pin actuation unit including:
  - a motor having a motor shaft configured to rotate about a motor axis;
  - a set of cams mounted on the motor shaft, each cam being engaged with a respective one of the braille pins in the respective set to move the respective braille pin between the raised position and the lowered position, the cams being oriented relative to one another so that upon rotation of the motor shaft the braille pins are sequentially raised and lowered into a series of distinct braille pin configurations, each braille pin configuration representing a different arrangement of the braille pins in the raised and lowered positions thereof; and
  - an angular position sensing system configured to monitor a rotational motion of the motor shaft about the motor axis and generate an output signal indicative of a passage of the motor shaft through a reference angular position during the rotational motion thereof.

In one embodiment, the plurality of braille pins consists of eight braille pins arranged in a rectangular braille pin array of four rows parallel to a row axis and two columns parallel to a column axis. In one embodiment, in each pin actuation unit, the motor axis is substantially parallel to the column axis.

In one embodiment, the pin actuation units consist of four pin actuation units. In one embodiment, for each pin actuation unit, the respective set of braille pins is a respective pair of braille pins, the respective set of cams consists of two cams, and the series of distinct braille pin configurations consists of four distinct braille pin configurations. In one embodiment, each respective pair of braille pins forms a respective one of the four rows of the braille pin array. In one embodiment, the four pin actuation units are arranged in a first stack and a second stack of two pin actuation units. In one embodiment, the first and second stacks are disposed in a mirror-symmetrical arrangement to each other relative to a mirror plane perpendicular to the column axis and passing centrally through the braille pin array. In one embodiment, the four rows consist of a first row, a second row adjacent to the first row, a third row adjacent to the second row, and a fourth row adjacent to the third row, the braille pins in the first row are actuated by an upper one of the pin actuation units of the first stack, the braille pins in the second row are actuated by a lower one of the pin actuation units of the first stack, the braille pins in the third row are actuated by a lower one of the pin actuation units of the second stack, and the braille pins in the fourth row are actuated by an upper one of the pin actuation units of the second stack, and the four braille pins in the first and fourth rows are shorter than the four braille pins in the second and third rows.

In one embodiment, the motor is a stepper motor.

In one embodiment, the angular position sensing system includes a modulator configured to provide a modulated signal that varies as a function of a rotation angle of the motor shaft about the motor axis, and a receiver configured to receive the modulated signal and produce therefrom the output signal.

In one embodiment, the angular position sensing system includes a processor configured to receive the output signal from the receiver and determine therefrom a current angular position of the motor shaft.

In one embodiment, the modulator includes at least one magnet producing a spatially varying magnetic field as the modulated signal, and the receiver includes a magnetic field sensor configured to sense an intensity of the spatially varying magnetic field produced by the at least one magnet during at least part of the rotational motion of the motor shaft and to generate, in response, the output signal. In one embodiment, the reference angular position of the motor shaft corresponds to a position of closest approach between the at least one magnet and the magnetic field sensor. In one embodiment, the at least one magnet includes a permanent magnet. In one embodiment, the at least one magnet consists of a single magnet or a pair of magnets. In one embodiment, the magnetic field sensor is a Hall effect sensor.

In one embodiment, the braille cell further includes a pin support assembly including a plurality of support arms holding the plurality of braille pins, each support arm having a base end connected to the frame and a pin end connected to and following a motion of a respective one of the braille pins as the respective braille pin is moved between the raised and lowered positions thereof by the pin actuation assembly. In one embodiment, the plurality of support arms includes flexible cantilever arms. In one embodiment, at least one of the support arms includes a curved portion. In one embodiment, the support arms are arranged in sets, the support arms in each set have the base ends thereof terminating in a common base portion connected to the frame, and each set of support arms and the respective braille pins held thereby together define one of a set of monolithic braille pin units.

In accordance with another aspect, there is provided a braille cell including:
- a frame including an upper cover having a plurality of apertures therein;
- eight braille pins arranged in a rectangular braille pin array of four rows parallel to a row axis and two columns parallel to a column axis, each braille pin having a longitudinal pin axis and being engaged with a respective one of the apertures and movable therein along the longitudinal pin axis between a raised position and a lowered position thereof; and
- a pin actuation assembly including four pin actuation units arranged in two stacks of two pin actuation units, each pin actuation unit for actuating two respective braille pins of the braille pin array, each pin actuation unit including:
  - a motor having a motor shaft configured for rotation about a motor axis; and
  - a pair of cams mounted on the motor shaft, each cam being engaged with a respective one of the two braille pins to move the respective braille pin between the raised position and the lowered position, the two cams being oriented relative to each other so that upon rotation of the motor shaft the braille pins are sequentially raised and lowered into four distinct braille pin configurations, each braille pin configuration representing a different arrangement of the two braille pins in the raised and lowered positions thereof.

In one embodiment, the first and second stacks are disposed in a mirror-symmetrical arrangement to each other relative to a mirror plane perpendicular to the column axis and passing centrally through the braille pin array.

In one embodiment, the four rows consist of a first row, a second row adjacent to the first row, a third row adjacent to the second row, and a fourth row adjacent to the third row. The braille pins in the first row are actuated by an upper one of the pin actuation units of the first stack, the braille pins in the second row are actuated by a lower one of the pin actuation units of the first stack, the braille pins in the third row are actuated by a lower one of the pin actuation units of the second stack, and the braille pins in the fourth row are actuated by an upper one of the pin actuation units of the second stack.

In one embodiment, the motor in each pin actuation unit is a stepper motor.

In one embodiment, each pin actuation unit includes an angular position sensing system configured to monitor a rotational motion of the motor shaft about the motor axis and generate an output signal indicative of a passage of the motor shaft through a reference angular position during the rotational motion thereof.

In one embodiment, the angular position sensing system includes a magnetic field sensor.

In one embodiment, the braille cell further includes a pin support assembly including a plurality of support arms holding the plurality of braille pins, each support arm having a base end connected to the frame and a pin end connected to and following a motion of a respective one of the braille pins as the respective braille pin is moved between the raised and lowered positions thereof by the pin actuation assembly.

In accordance with another aspect, there is provided a braille cell assembly including a plurality of braille cells, each of which including support arms such as described herein, wherein the support arms of all the braille cells on one side thereof are joined together to define a first monolithic braille pin unit, and wherein the support arms of all the braille cells on the opposite side thereof are joined together to define a second monolithic braille pin unit. In some implementations, the first and second monolithic braille pin units can be disposed in a mirror-symmetrical relationship with respect to each other. In some implementations, the plurality of braille cells consists of between two and four braille cells.

In accordance with another aspect, there is provided a refreshable braille display including an array of braille cells as described herein.

Other features and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features can be combined with one another unless stated otherwise. Non-limiting examples of such specific features can include: a pin support assembly including a plurality of support arms; a plurality of support arms forming monolithic braille pin units; a pin actuation unit including an angular position sensing system; and a pin actuation unit including two stacks of dual-cam pin actuation units.

BRIEF DESCRIPTION OF THE DRAWINGS

In FIG. 1A, the braille device includes a touch-sensitive surface configured to implement a virtual braille keyboard for the entry of braille data. In FIG. 1B, the braille device includes a physical braille keyboard for the entry of braille data. In FIG. 1C, the braille device is a braille reader having no braille keyboard for the entry of braille data.

FIG. 7 is a top view of FIG. 2, but with the upper cover of the frame shown in transparency to better illustrate other components of the braille cell.

In FIG. 11, the upper cover of the frame of the braille assembly is shown in transparency to better illustrate the components of the monolithic braille pin units.

DETAILED DESCRIPTION

Figure 1A:
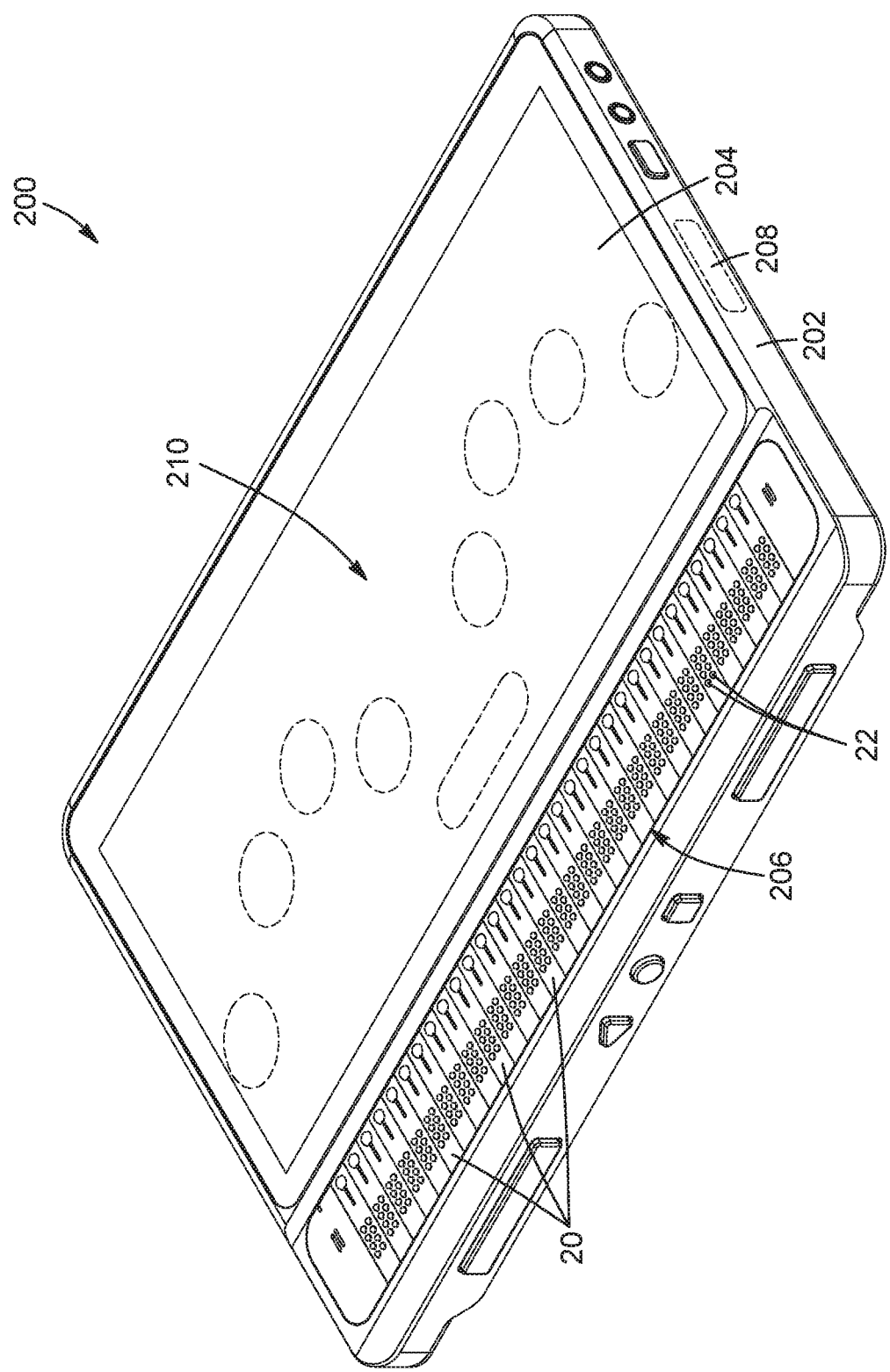
FIGS. 1A to 1C are perspective views of examples of braille devices including a refreshable braille display in which some of the present techniques can be implemented. The refreshable braille display includes a linear array of braille cells, each braille cell including a plurality of braille pins that may be supported and/or actuated in accordance with the present techniques.

In the present description, similar features in the drawings have been given similar reference numerals. To avoid cluttering certain figures, some elements may not have been indicated if they were already identified in a preceding figure. The elements of the drawings are not necessarily depicted to scale, since emphasis is placed upon clearly illustrating the elements and structures of the present embodiments. Furthermore, positional descriptors such as "top" and "bottom", "upper" and "lower", "horizontal" and "vertical", "raised" and "lowered", "inner" and "outer", "inward" and "outward", "projected" and "retracted", "above" and "below", "clockwise" and "counterclockwise", and other like terms indicating the position and/or orientation of one element with respect to another element are used herein for ease and clarity of description. Unless otherwise indicated, these positional descriptors should be taken in the context of the figures and should not be considered limiting. It will be appreciated that such spatially relative terms are intended to encompass different orientations in use or operation of the present embodiments, in addition to the orientations exemplified in the figures.

Unless stated otherwise, the terms "connected", "coupled", and variants and derivatives thereof, refer herein to any structural or functional connection or coupling, either direct or indirect, between two or more elements. The connection or coupling between the elements may be mechanical, optical, electrical, magnetic, operational, logical, or a combination thereof. Particularly, the terms "releasably connected" or "releasably coupled", and variants and derivatives thereof, mean that the two or more elements can be joined to and disjoined from one another by a user, with or without a tool, and without substantially damaging any of the elements.

In the present description, the term "vertical" refers to a direction or a plane generally parallel to the direction of motion of the braille pins between their raised and lowered positions. Meanwhile, the term "horizontal" refers to a direction or a plane generally perpendicular to the direction of motion of the braille pins between their raised and lowered positions. Particularly, the reference surface or plane above and below which the braille pins respectively protrude from and retreat into in their rise and fall positions can be considered a generally horizontal surface or plane.

In the present description, the terms "a", "an" and "one" are defined to mean "at least one", that is, these terms do not exclude a plural number of items, unless stated otherwise.

Terms such as "substantially", "generally" and "about", that modify a value, condition or characteristic of a feature of an exemplary embodiment, should be understood to mean that the value, condition or characteristic is defined within tolerances that are acceptable for proper operation of this exemplary embodiment for its intended application.

The present description discloses various implementations of braille cells. A braille cell generally includes a plurality of parallel braille pins individually movable between raised and lowered positions to form different combinations of up and down pins that represent different braille characters to be displayed for tactile reading by a user. In accordance with various non-limiting aspects, the present description relates to a braille cell including a plurality of braille pins and a plurality of support arms holding the braille pins; a monolithic braille pin unit including a set of braille pins, a base portion, and a set of support arms connected between the braille pins and the base portion; a pin actuation unit including a motor having a rotatable motor shaft, a set of cams mounted on the motor shaft to selectively move a set of braille pins up and down, and an angular position sensing system for monitoring the rotational motion of the motor shaft; a braille cell including such pin actuation units; a braille cell including dual-cam pin actuation units arranged in two stacks; and a refreshable braille display including an array of braille cells such as described herein.

Figure 1B:
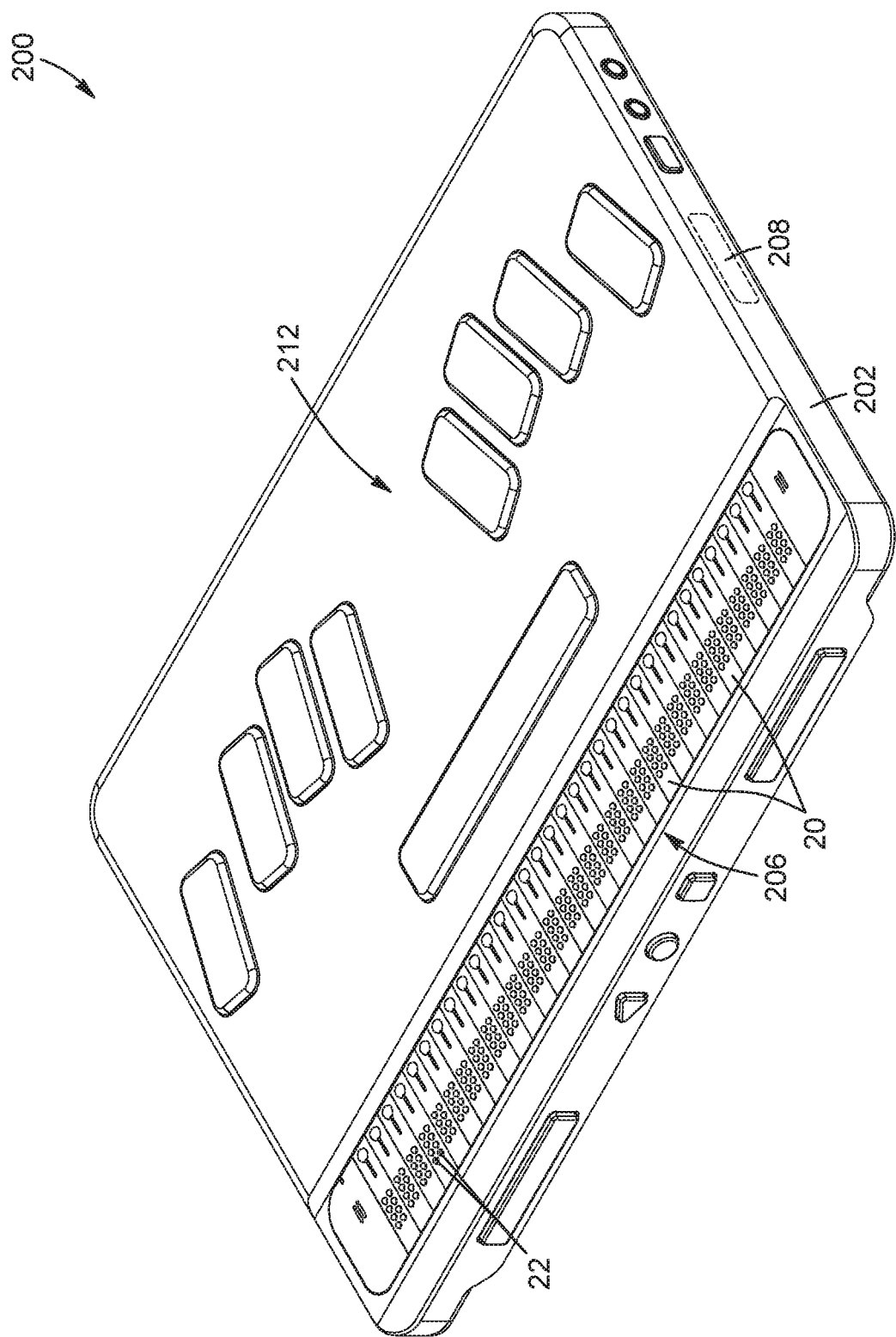
Figure 1C:
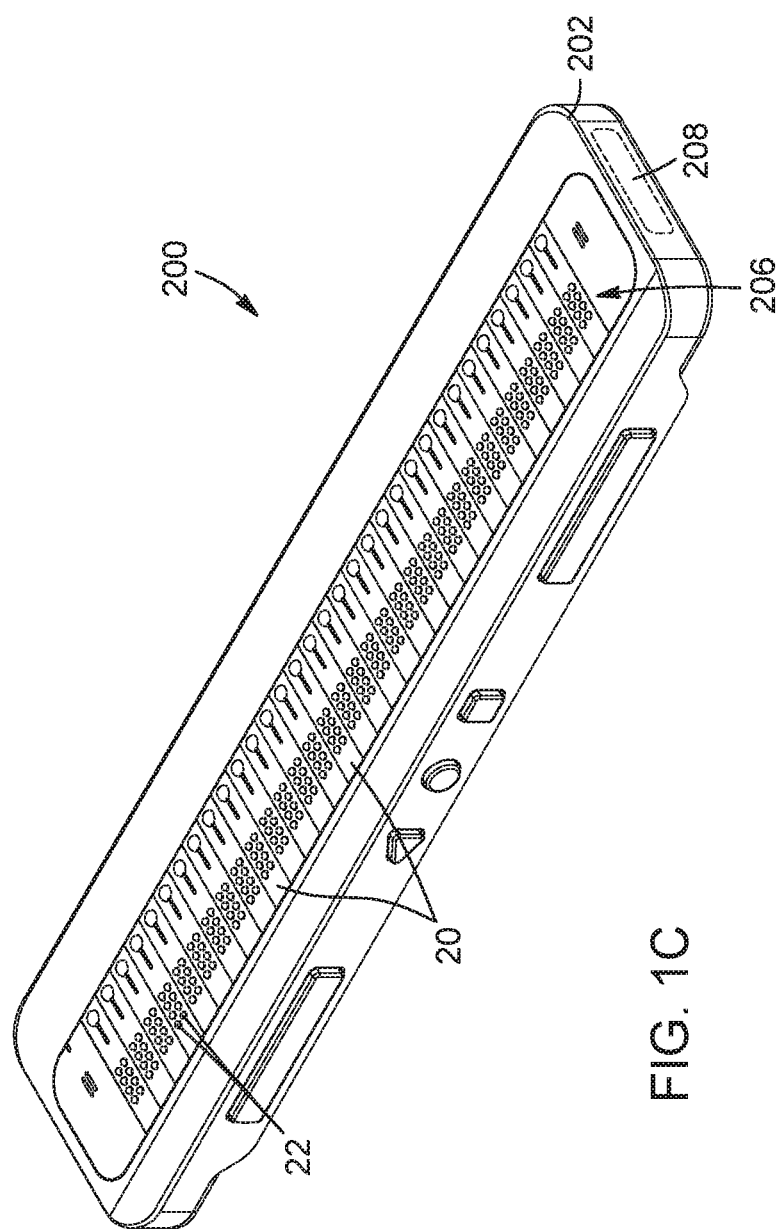
Figure 2:
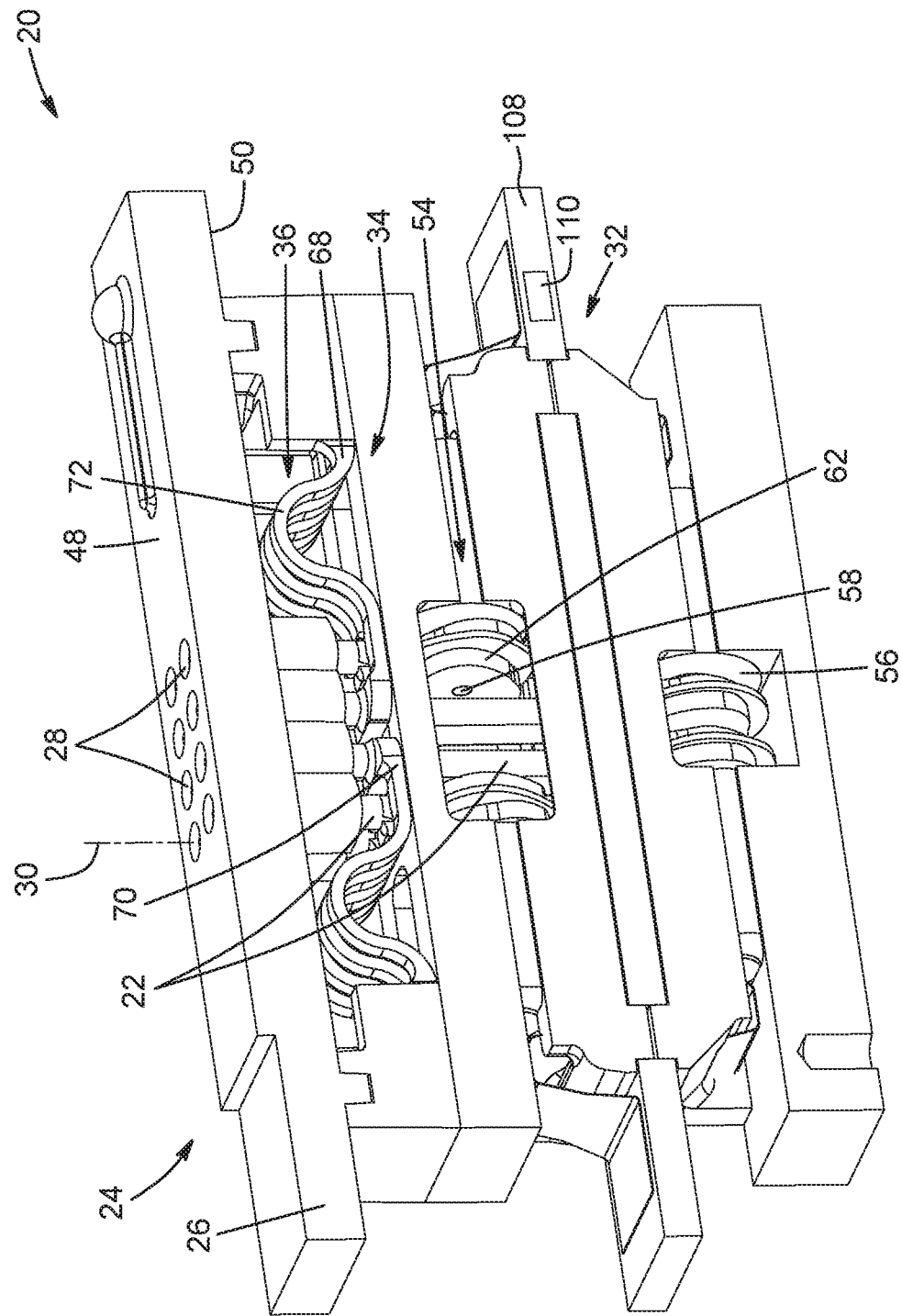
FIG. 2 is a perspective view of a braille cell, in accordance with a possible embodiment.
Figure 3:
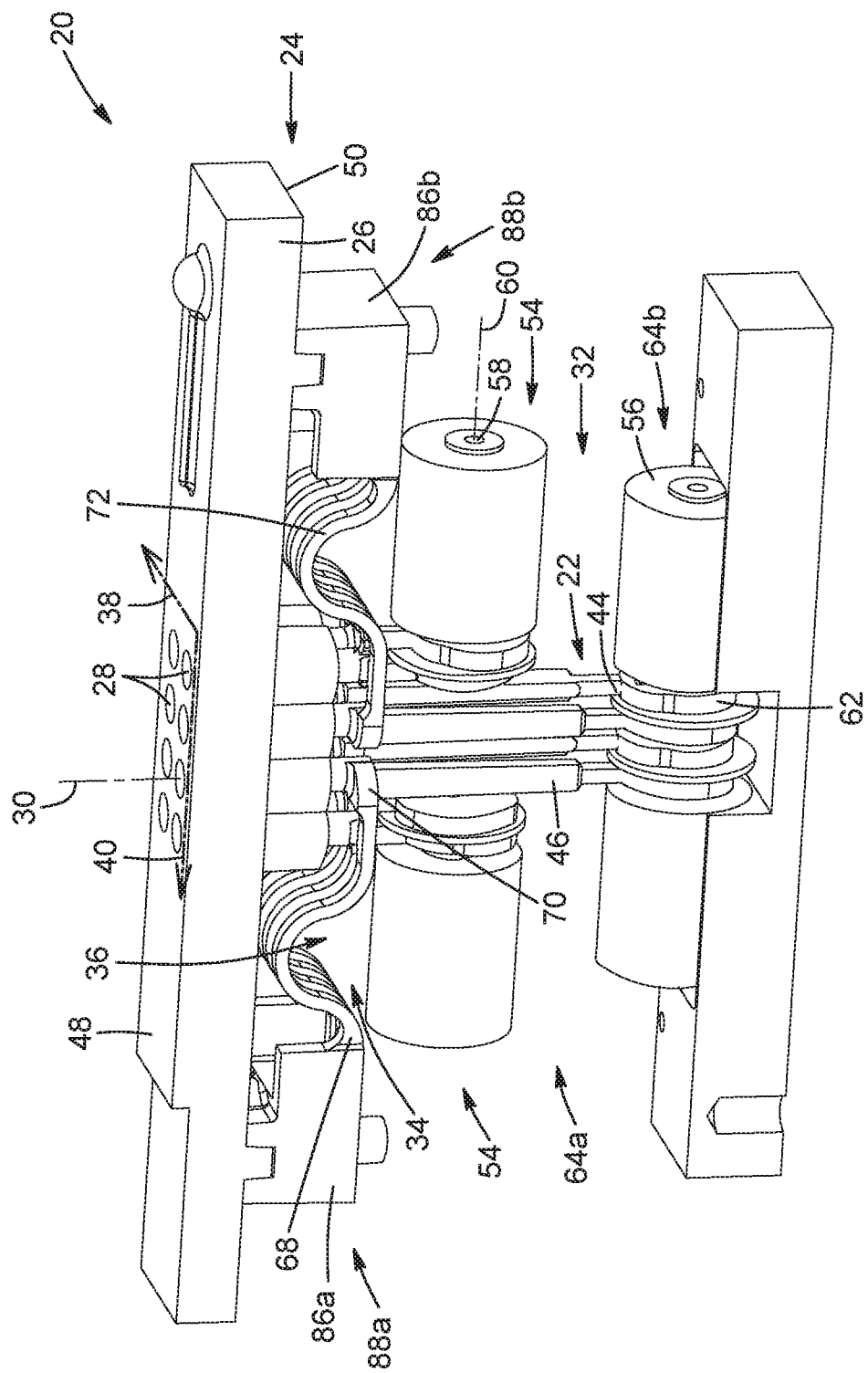
FIG. 3 is another perspective view of the braille cell of FIG. 2, in which some components of the frame have been removed to better illustrate other components of the braille cell.
Figure 4:
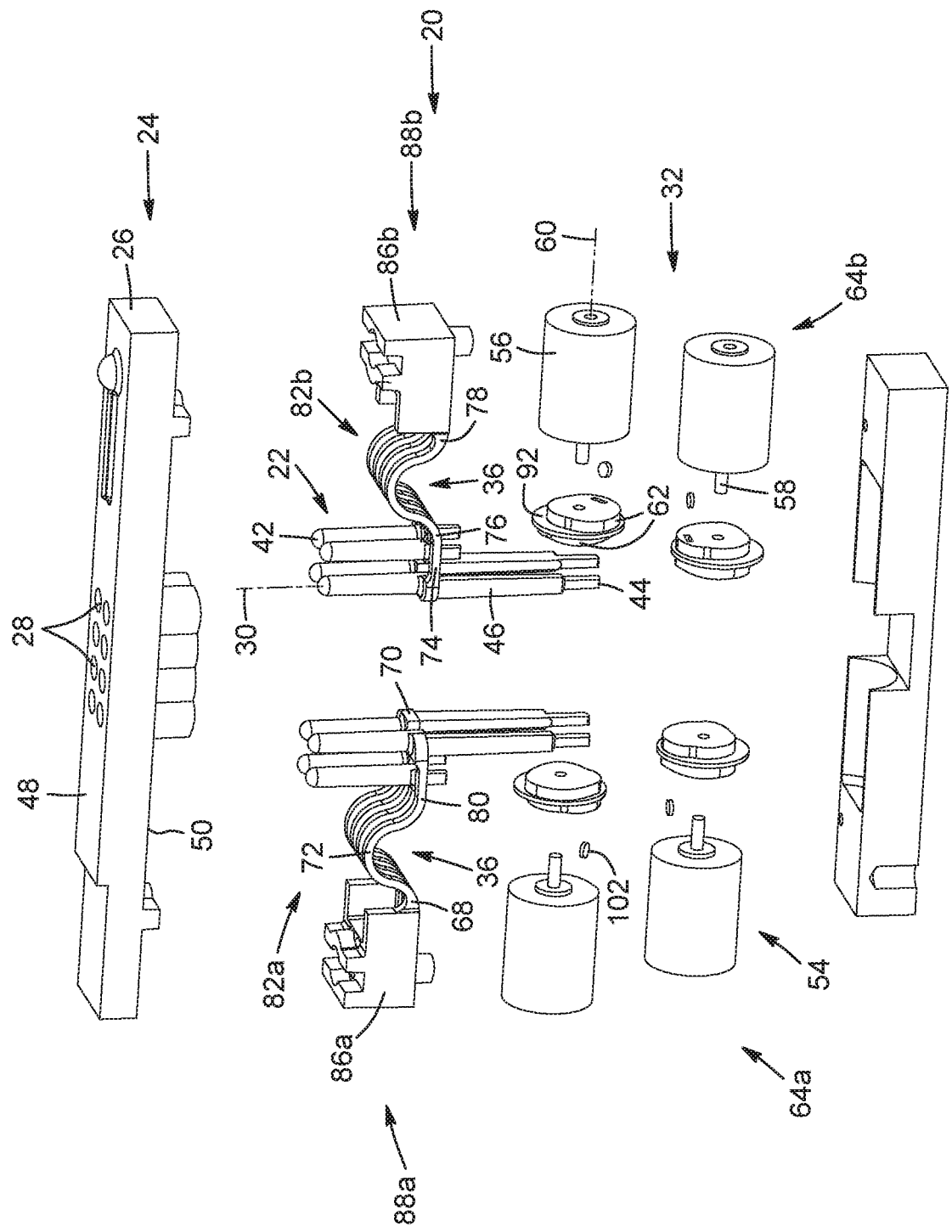
FIG. 4 is a partially exploded view of FIG. 3.
Figure 6:
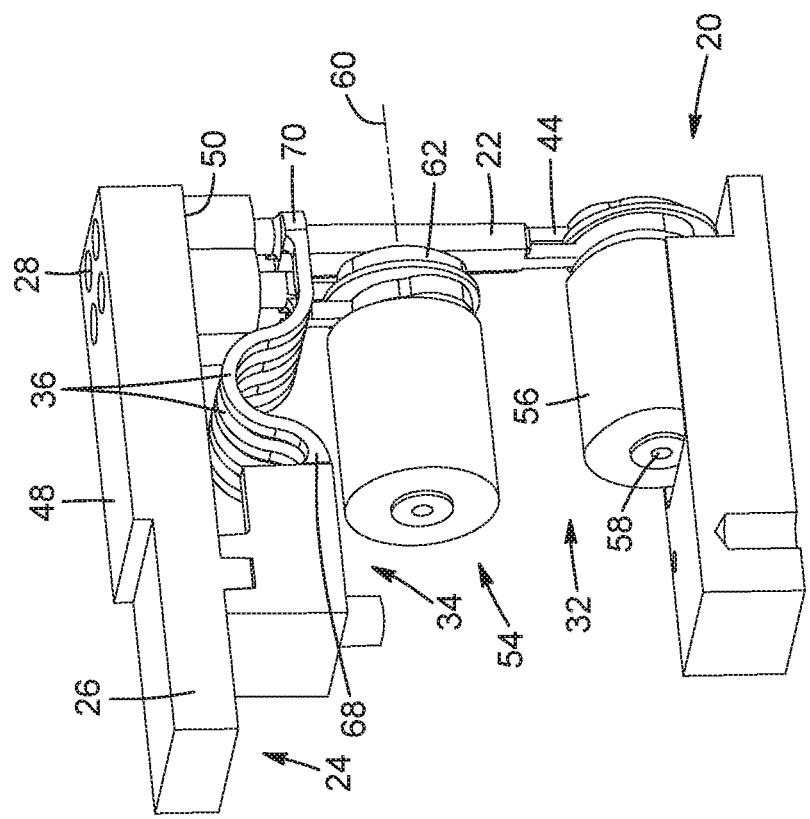
FIG. 6 corresponds to FIG. 5, but viewed from another perspective.
Figure 5:
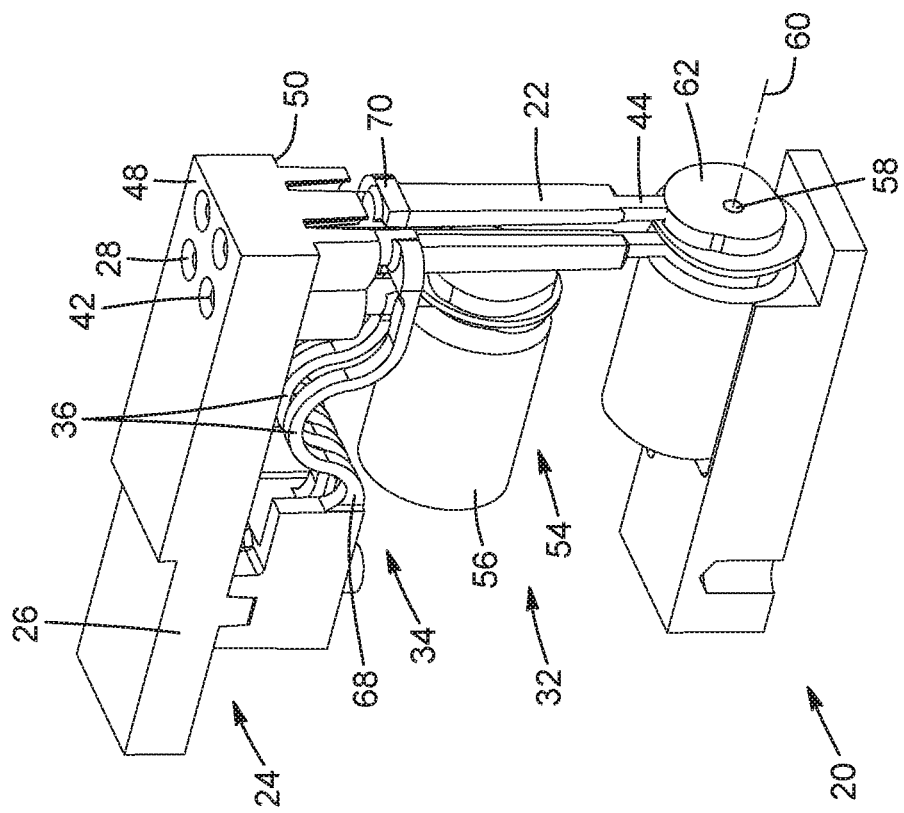
FIG. 5 is a schematic cross-sectional perspective view of FIG. 2, taken along a section line passing centrally between the second and third rows of braille pins.

The present techniques can be implemented in various devices and systems provided with one or more braille displays. Non-limiting examples of such devices and systems are braille readers, note takers, tablets, mobile phones, electronic signs, calculators, watches, and the like. These braille devices and systems can be intended for use either as standalone units or in communication with other equipment. Non-limiting examples of such devices and systems are illustrated in FIGS. 1A to 1C. Other non-limiting examples of braille devices are disclosed in co-assigned U.S. Pat. Appl. Pub. Nos. 2015/0262509 and 2016/0034180, the entire contents of both applications being incorporated herein by reference.

The present techniques can be useful in various applications where it is needed or desirable to provide braille pin support and/or actuation in a refreshable braille display for use by individuals suffering from blindness, low vision or other visual impairments. It is appreciated, however, that while terms such as "blind", "low-vision", and "print-disabled" are sometimes defined as referring to specific levels of visual acuity, the present techniques can be used by sighted people who do not suffer from any visual impairment but nonetheless wish to communication using braille.

Referring to FIG. 1A, there is illustrated an example of a portable electronic braille device 200 in which the techniques disclosed herein can be implemented. The braille device 200 generally includes a housing 202, a touch-sensitive surface 204, a refreshable braille display 206 and a processing or control unit 208. The housing 202 houses, supports and/or protects various components of the braille device 200. In FIG. 1A, the touch-sensitive surface 204 is configured to implement a virtual braille keyboard 210 for entering braille data. Depending on the application, the touch-sensitive surface 204 can be based on different touch-sensing technologies, for example capacitive sensing. The implementation of a virtual braille keyboard 210 on the touch-sensitive surface 204 allows braille to be typed via tactile/haptic interactions. Referring to FIG. 1B, in another variant, the braille device 200 can include a physical braille keyboard 212 rather than a virtual braille keyboard. Referring to FIG. 1C, in yet another variant, the braille device 200 can be a braille reader that includes a braille display 206, but no braille keyboard or input interface for entering braille data.

Returning to FIG. 1A, the refreshable braille display 206 enables tactile reading of output braille data. In the present description, the term "refreshable" means that the braille display 206 can change over time, either automatically or controllably, the braille data that it presents for tactile reading. In FIG. 1A, the refreshable braille display 206 includes a linear array of thirty-two braille cells 20, but other applications could use a different number of cells (e.g., 12, 14, 18, 20, 32, 40, 64 or 80) and/or a cell arrangement different from a linear array (e.g., a two-dimensional cell array or matrix). Each braille cell 20 of the display 206 includes a plurality of braille pins 22. Each braille pin 22 is individually movable up and down in response to control signals to form different combinations of projected and retracted pins representing different braille characters. Each braille cell 20 also includes a pin actuation assembly (not shown in FIG. 1A) configured to selectively move the braille pins 22 between their extended and retreated positions. The braille cell 20 can be constructed and designed according to the techniques described herein.

The processing unit 208 is provided inside the housing 202. The term "processing unit" refers to an entity of the braille device 200 that controls or executes functions to operate the braille device 200. Non limiting examples of such functions include transmitting output braille data to the refreshable braille display 206, and receiving input braille data entered via the virtual braille keyboard 210 implemented on the touch-sensitive surface 204. As described below, the processing unit 208 may be operatively connected to the pin actuation assembly of a braille cell 20 to control the up-and-down motion of its braille pins 22. The processing unit 208 may be embodied by a microprocessor, a microcontroller, a central processing unit (CPU), a processing core, a system on a chip (SoC), a digital signal processor (DSP), a programmable logic device, an application processor, or by any other processor or combination of processors configured to operate collectively as a processing unit. The processing unit 208 can be implemented in hardware, software, firmware, or any combination thereof, and be connected to the various components of the braille device 200 via various input/output (I/O) communication ports.

Various implementations of the present techniques will now be described with reference to the figures.

Referring to FIGS. 2 to 7, there are shown various views of a first embodiment of a braille cell 20. The braille cell 20 can be used as one of a plurality of cells in a refreshable braille display such as the ones shown in FIGS. 1A to 1C. Broadly described, the braille cell 20 generally includes a frame or casing 24 including an upper cover 26 having a plurality of apertures or openings 28 therein; a plurality of braille pins 22, each braille pin 22 extending along a longitudinal pin axis 30 and being engaged with a respective one of the apertures 28 and movable therein along the longitudinal pin axis 30 between a raised position and a lowered position thereof; a pin actuation assembly 32 configured to selectively move each braille pin 22 between the raised position and the lowered position thereof; and a pin support assembly 34 including a plurality of support arms 36 holding the plurality of braille pins 22. The structure, configuration, functionality, and operation of these and other possible components of the braille cell 20 are described in greater detail below.

In the illustrated embodiment, the plurality of braille pins 22 consists of eight braille pins 22 arranged in a rectangular 4×2 braille pin array of four rows, parallel to a row axis 38, and two columns, parallel to a column axis 40. Other pin array configurations are possible in other variants, for example, six pins arranged in a 3×2 braille pin array of three rows and two columns. Each braille pin 22 has a top end 42, defining a pin head, a bottom end 44, defining a pin foot, and a pin body 46 extending between the top end 42 and the bottom end 44 along the longitudinal pin axis 30.

The frame 24 generally defines the overall shape of the braille cell 20. For example, in the illustrated embodiment, the braille cell 20 is generally shaped as a rectangular prism, although the shape can vary depending on the application. The frame 24 is configured to house, hold and protect other components of the braille cell 20. Depending on the application, the frame 24 can be of a single-piece integral construction or a multiple-piece construction. The frame 24 can further include projections, recesses, channels, cavities, and the like, defining an inner structure or skeleton for supporting various components of the braille cell 20.

The upper cover 26 of the frame 24 includes an outer face 48 and an inner face 50 between which the plurality of apertures 28 extends. The number and arrangement of the apertures 28 on the upper cover 26 match the number and arrangement of the braille pins 22, that is, eight apertures 28 arrayed in four rows and two columns in the illustrated embodiment. Each braille pin 22 is inserted in and longitudinally movable relative to a respective one of the apertures 28. As a result, the top end 42 of each braille pin 22 projects from the outer face 48 and partly out of its respective aperture 28 in the raised position and retracts below the outer face 48 and into the aperture 28 in the lowered position. The outer face 48 of the upper cover 26 can therefore define the horizontal reference surface relative to which the braille pins 22 extends and retracts as they move vertically between their up and down positions.

Figure 8:
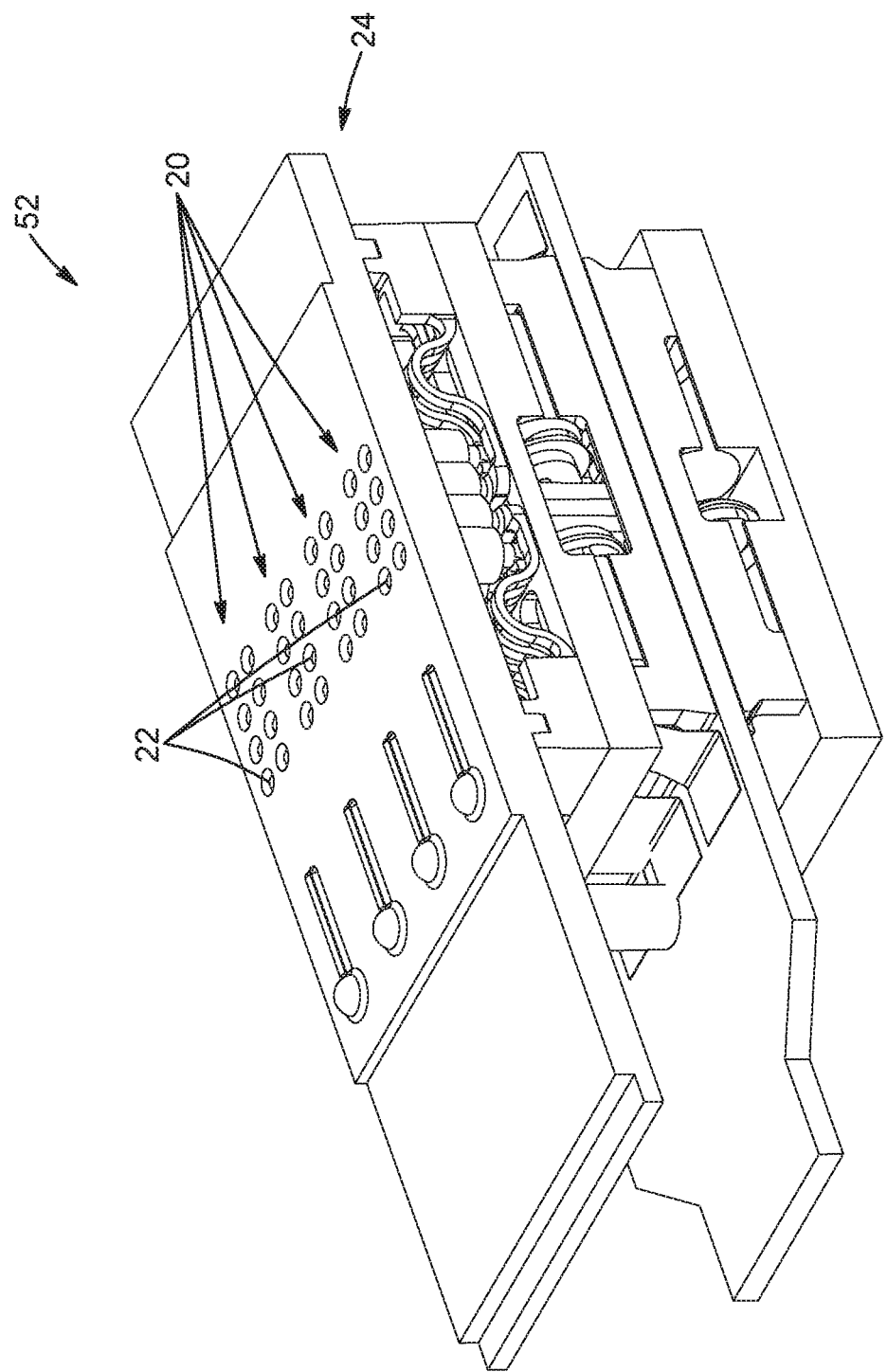
FIG. 8 is a perspective view of a possible embodiment of a braille cell assembly including a group of four integrated braille cells having a common frame and sharing electric/electronic circuits and contacts.

It is appreciated that while the braille cell 20 in FIGS. 2 to 7 is depicted as a discrete building block unit that can be individually mounted to and removed from a refreshable braille display such as the ones shown in FIGS. 1A to 10, this may not be the case in other implementations. For example, referring to FIG. 8, a braille cell assembly 52 made up of a group of integrated braille cells 20 having a common frame 24 and sharing electric/electronic circuits and contacts (not shown) can instead define the individual building block unit of a refreshable braille display. In FIG. 8, the braille cell assembly 52 is made up of four braille cells, each of which including eight braille pins 22. In some implementations, the grouping of braille cells into integrated braille cell assemblies can facilitate the assembly process by reducing the number of distinct parts to assemble into a refreshable braille display.

Returning to FIGS. 2 to 7, the pin actuation assembly 32 includes four pin actuation units 54 for individually actuating the eight braille pins 22 up and down. Each actuation unit 54 selectively actuates two braille pins 22. Each pin actuation unit 54 generally includes a motor 56 having a motor shaft 58 rotatable about a motor axis 60, and a pair of cams 62 mounted on the motor shaft 58. The motor 56 is configured to provide a torque sufficient to lift the braille pin 22 up against its own weight and bring it to its raised position.

In the illustrated embodiment, the eight braille pins 22 are arranged in four rows and two columns, and the four pin actuation units 54 are arranged below the upper cover 26 of the frame 24 in a first two-level stack 64a and a second two-level stack 64b adjacent to each other. For example, the two stacks 64a, 64b can be disposed in a mirror-symmetrical arrangement to each other relative to a mirror plane 66 perpendicular to the column axis 40 and passing centrally through the braille pin array (i.e., centrally between the second and third rows of braille pins 22). The motor axis 60 in each pin actuation unit 54 is substantially parallel to the column axis 40.

In the illustrated embodiment, the braille pins 22 in the first row are associated with the upper pin actuation unit 54 of the first stack 64a, the braille pins 22 in the second row are associated with the lower pin actuation unit 54 of the first stack 64a, the braille pins 22 in the third row are associated with the lower pin actuation unit 54 of the second stack 64b, and the braille pins 22 in the fourth row are associated with the upper pin actuation unit 54 of the second stack 64b. Due to the two-level stacked arrangement of the pin actuation units 54, the braille pins 22 in the braille cell 20 are not all the same length, being shorter in the first and fourth rows than in the second and third rows.

It is appreciated that the pin actuation assembly 32 illustrated in FIGS. 2 to 7 is provided by way of example only and that various other pin actuation unit arrangements and pin actuation technologies can be used in other implementations which may or may not be the same for all the braille pins in the cell. Furthermore, in other implementations, the pin actuation assembly need not include rotary cams driven by electric motors, but could use various other braille pin actuation technologies including, but not limited to, technologies based on piezoelectric actuators such as those used in commercially available braille displays. More detail regarding possible implementations of pin actuation assemblies will be provided below.

Support Arm Implementations

Various possible implementations of a braille pin support assembly including a plurality of support arms for use in a braille cell are described below.

Referring to FIGS. 2 to 7, the braille cell 20 includes a pin support assembly 34 having a plurality of support arms 36 to hold the plurality of braille pins 22. In the illustrated embodiment, the plurality of support arms 36 consists of eight support arms, each of which supporting a respective one of the eight braille pins 22. However, in other implementations the number of support arms 36 need not match the number of braille pins 22.

In the present description, the term "support arm" refers broadly to a structural element that holds and provides mechanical stability to a braille pin without compromising or otherwise adversely affecting the bidirectional up-and-down motion of the braille pin driven by the associated pin actuation unit and without causing or inducing excessive or unwanted mechanical stresses or deformations in the braille pin.

In FIGS. 2 to 7, each support arm 36 has a base end 68 connected to the frame 24 and a pin or free end 70 connected to and following the motion of the associated braille pin 22 as the braille pin 22 is moved between the raised and lowered positions thereof by the associated pin actuation unit 54 of the pin actuation assembly 32. Depending on the application, each support arm 36 and its respective braille pin 22 may be integrally formed, or provided as separate parts coupled to each other. In the illustrated embodiment, the base end 68 of each support arm 36 is connected to the inner face 50 of the upper cover 26 of the frame 24, and the pin end 70 is connected to the pin body 46 of the respective braille pin 22 at a connection point closer to the top end 42 than to the bottom end 44. Other configurations are possible in other embodiments. For example, the base end 68 of one or more support arms 36 may be connected on the frame 24 elsewhere than on the inner face 50 of the upper cover 26 and/or the pin end 70 of one or more support arms 36 may be connected closer to the bottom end 44 than to the top end 42 of their respective braille pins 22. Depending on the application, the support arms 36 may or may not be releasably connected to the frame 24. As described in greater detail below, the provision of a releasable connection between the support arms 36 and the frame 24 can enable or facilitate manufacture, assembly, cleaning, repair and/or replacement of the support arms 36 and the braille pins 22 connected thereto.

Figure 9B:
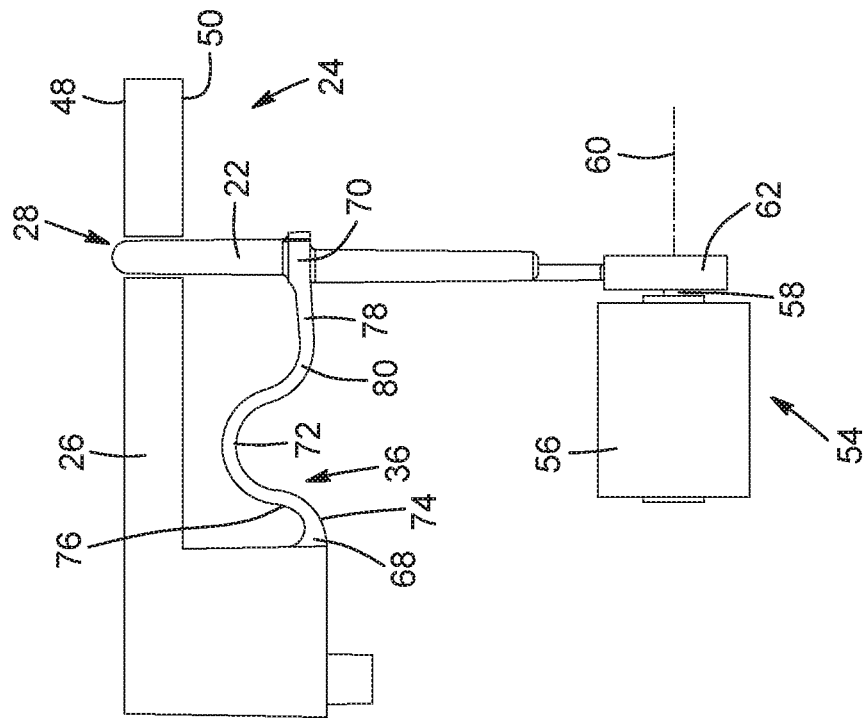
FIGS. 9A and 9B are schematic representations of an example of a flexible cantilever support arm being caused to bend up from its natural, unbent state as the braille pin is actuated to rise from its lowered position (FIG. 9A) to its raised position (FIG. 9B).
Figure 9A:
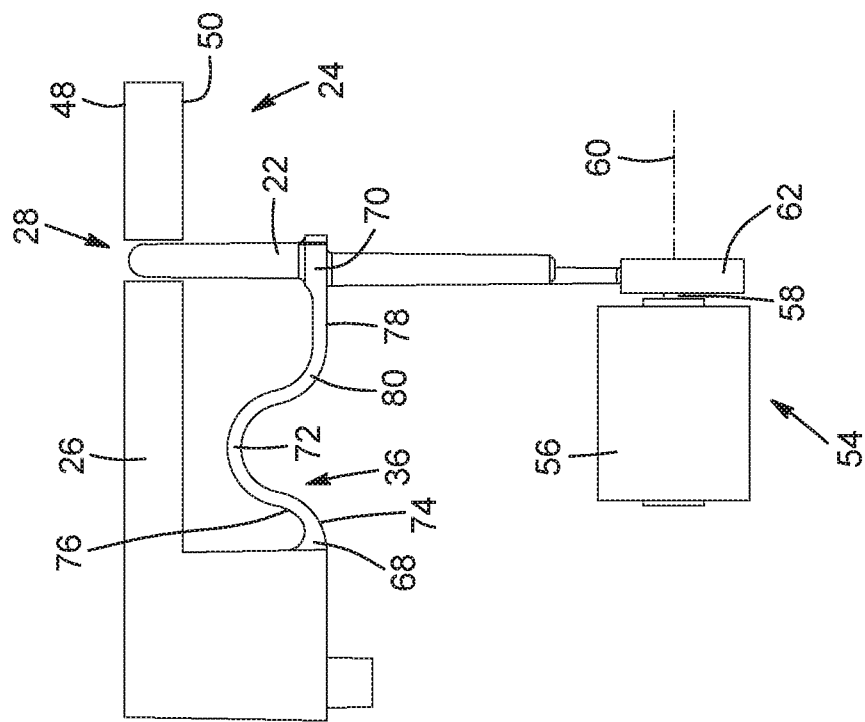

In the illustrated embodiment, the support arms 36 are embodied by flexible cantilever arms. In such a case, the base end 68 of each support arm 36 is fixedly connected to the frame 24 and the pin end 70 follows the up-and-down motion of its associated braille pin 22 between its raised and lowered positions as it is driven by the pin actuation assembly 32. Because each braille pin 22 is constrained to move along a substantially vertical path defined by the aperture 28 in which the braille pin 22 is inserted, so is the pin end 70 of the support arm 36 connected to the braille pin 22. Consequently, the support arm 36 may be flexible enough to follow such a motion of the braille pin 22 while preventing premature or unwanted wear, damage or degradation thereof. Referring briefly to FIGS. 9A and 9B, there is provided a schematic representation of an example of a flexible cantilever support arm 36 being caused to bend up from its natural, unbent state as the braille pin 22 is actuated by the associated pin actuation unit 54 to rise from its lowered position (FIG. 9A) to its raised position (FIG. 9B).

It is appreciated that the present techniques are not limited to support arms having a cantilevered configuration, and that other support arm configurations can be used in some implementations. For example, in some scenarios, pivotal hinge joints or spring-loaded configurations could be used to achieve the same functionality.

In addition to providing support and flexibility, the support arms can also provide a restoring force to the braille pins that, alone, would tend to resiliently urge or bias the braille pins in their lowered position. This restoring force is the force that tends to return or bring back the support arm to its neutral, unflex state. In some implementations, such as in the embodiment shown in FIGS. 2 to 7, the vertical motion of a braille pin is actuated by rotating a cam to engage the braille pin from below and push the braille pin upward against gravity to bring the braille pin from its retracted position to its extended position. In such implementations, the cam is operable, upon further rotation thereof, to permit the braille pin to return by gravity to its retracted position. However, because the braille pin is not actively pulled or pushed downward by the cam, in some scenarios, the braille pin may not, or not easily, return to its lowered position if it is not connected to a support arm. This scenario could happen, for example, when debris, dust or other foreign matter accumulate in and clog the aperture in which the braille pin is inserted, and therefore prevent or at least impede the braille pin from returning to its lowered position solely by its own weight. By connecting the braille pin to a support arm and positioning the support arm such that the braille pin is retracted when the support arm is unflexed, the support arm can exert a restoring force on the braille pin that effectively increases the weight of the braille pin and that enables, or helps enable, the braille pin to return more easily to its lowered position. In some implementations, the restoring force provided by the support arm can be sufficiently strong for the braille pin to remain in the lowered position, that is, recessed in its aperture, even if the braille cell is turned upside down.

The support arms 36 can be made in a variety of shapes, sizes and materials to provide specified or required properties, for example in terms of mechanical parameters such as flexibility, strength, durability, support, service life, weight, and the like. Depending on the application, the support arms 36 may or may not all have the same geometry and/or composition. In some implementations, the support arms 36 can be made of a low-stress, self-supporting material, for example plastic material such as polyoxymethylene (POM). The support arms 36 can have a variety of cross-sectional shapes (e.g., circular, rectangular, square) and areas (e.g., about 0.5 mm×0.5 mm), which may or may not remain constant along their length.

In some implementations, the support arms 36 can be straight from the base end 68 to the pin end 70, though this is not a requirement. For example, other implementations, such as in FIGS. 2 to 7, can include curved, meandering or serpentine support arm configurations. The provision of curved, irregular or otherwise non-straight support arms can increase their effective length and thereby increase their flexibility compared to straight support arms having the same cross-sectional area. Equivalently, this means that, in general, non-straight support arms can have larger cross-sectional areas, and therefore increased strength, durability and service life, than straight support arms for the same flexibility. Non-straight support arms can therefore be advantageous in some applications where achieving a certain flexibility would require, if straight support arms were instead used, such small cross-sectional areas that the tolerance of the support arms to wear and damage would be reduced to unacceptable levels.

Referring still to FIGS. 2 to 7, and further to FIGS. 9A and 9B, each support arm 36 includes a curved portion 72 extending along a path lying in a vertical plane and including a convex upward curve (when viewed from above), characterized by a generally bell-shaped or dome-shaped profile. Of course, depending on the application, the curved portion 72 may have a variety of other profiles and shapes. For example, the curved portion 72 may extend along a path lying in another plane, horizontal or otherwise, or along a three-dimensional path not constrained to a specific plane. In the illustrated embodiment, each support arm 36 further includes a first substantially straight portion 74 extending from the base end 68 to a first end 76 of the curved portion 72 and a second substantially straight portion 78 extending from a second end 80 of the curved portion 72 to the pin end 70 where the second substantially straight portion 78 is connected to the respective braille pin 22. In the illustrated embodiment, the first and second substantially straight portions 74, 78 of the support arms are both lying in a horizontal plane, with the second substantially straight portion 78 being transverse to the longitudinal pin axis 30 of the respective braille pin 22. Of course, this need not be the case in other embodiments.

In FIGS. 2 to 7, the support arms 36 generally extend lengthwise parallel to one another and to the column axis 40 of the braille pin array, and generally perpendicular to the direction of longitudinal motion of the braille pins 22. In such a configuration, the support arm 36 therefore hangs from and extends below and substantially along the inner face 50 of the upper cover 26 of the frame 24. Particularly, the support arms 36 are disposed generally below the upper cover 26 of the frame 24 but above the pin actuation assembly 32.

In some implementations, the support arms 36 can be arranged in a plurality of sets. For example, in the illustrated embodiment, the support arms 36 are arranged in a first set 82a and a second set 82b, each set including four support arms 36. The four support arms 36 of the first set 82a hold the four braille pins 22 located in the first and second rows of the braille pin array, while the four support arms 36 of the second set 82b hold the four braille pins 22 located in the third and fourth rows of the braille pin array. Particularly, the support arms 36 of the first set 82a connected to the braille pins 22 in the first row extend inwardly of the support arms 36 connected to the braille pins 22 in the second row with respect to a central plane 84 perpendicular to the row axis 38 and passing centrally between the two columns, and likewise for the support arms 36 of the second set 82b connected to the braille pins 22 in the fourth row with respect to the support arms 36 connected to the braille pins 22 in the third row. In such a configuration, the first and second sets 82a, 82b of support arms 36 can be disposed in a mirror-symmetrical arrangement to each other relative to a mirror plane 66 perpendicular to the column axis 40 and passing centrally through the braille pin array (i.e., centrally between the second and third rows of braille pins 22), as best shown in FIG. 7. Of course, various other symmetrical and non-symmetrical arrangements can be used in other variants.

In some implementations, the pin support assembly 34 can be configured such that, in each set of support arms 36, the support arms 36 have the base ends 68 thereof terminating in a common base portion connected to the frame 24 and define, together with the respective braille pins 22 held thereby, a monolithic braille pin unit. In the illustrated embodiment, the base ends 68 of the four support arms 36 terminate in a first common base portion 86a. Likewise, the base ends 68 of the four support arms 36 of the second set 82b terminate in a second common base portion 86b. Both the first and second common base portions 86a, 86b are connected to the frame 24, for example to the inner face 50 of the upper cover 26. In such a configuration, the four support arms 36 of the first set 82a and the four respective braille pins 22 held thereby can define a first monolithic braille pin unit 88a, and the four support arms 36 of the second set 82b and the four respective braille pins 22 held thereby can define a second monolithic braille pin unit 88b.

Using such monolithic braille pin units 88a, 88b, in each of which a group of the braille pins 22 and a corresponding group of support arms 36 are provided as a single-body, unitarily-formed structure, can speed up and/or simplify manufacturing and assembly processes. For example, using such monolithic braille pin units 88a, 88b can reduce the number of individual components that make up the braille cell 20 and/or allow for easier alignment of the braille pins 22, which otherwise can be challenging due to their relatively small sizes when provided as individual components. Furthermore, in some implementations, the monolithic braille pin units 88a, 88b can be releasably connected to the frame 24 (see FIG. 10), which can simplify the disassembly or reassembly process of the braille pins 22, for example for cleaning, inspection, maintenance, repair and/or replacement.

It is appreciated that the number, size, shape, arrangement and material of the support arms within the braille cell can be adjusted depending on the application to meet specified, desired or required criteria, constraints or specifications with respect to mechanical and physical properties. Particularly, the support arm configuration depicted in FIGS. 2 to 7 is provided for illustrative purposes, and a variety of other support arm configurations are possible in other embodiments.

Monolithic Braille Pin Unit Implementations

Monolithic braille pin units were depicted and described above as being components of a braille cell. However, it is appreciated that such monolithic braille pin units can also be provided as separate integrated units intended for use in, but manufactured, supplied and sold independently of, braille cells. For example, such integrated units can be used as replacement parts in maintenance, repair and/or service applications.

Figure 10:
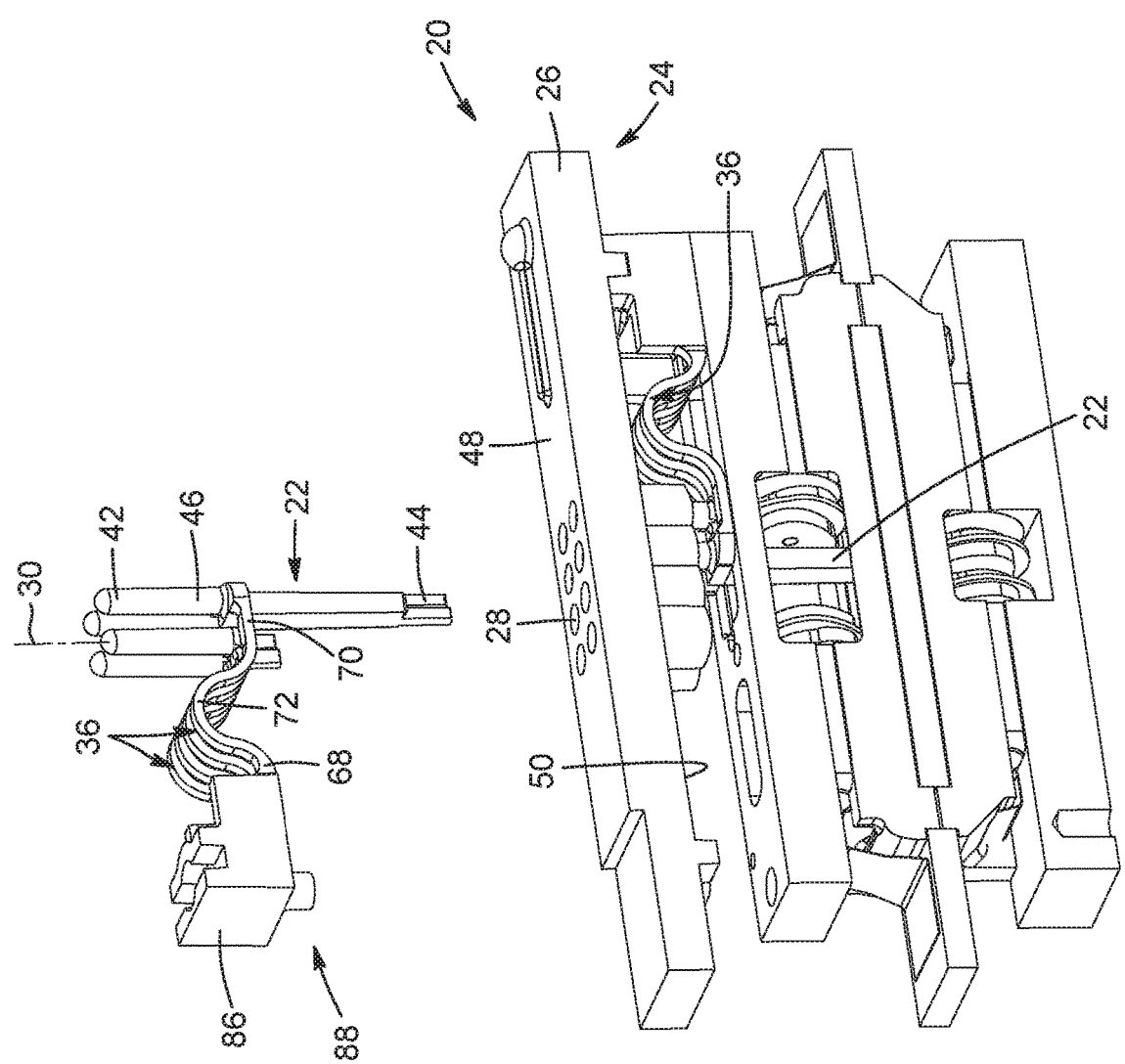
FIG. 10 is a representation of a possible embodiment of a monolithic braille pin unit for use in, but shown separately from, a braille cell. The monolithic braille pin unit includes a set of arms, a base portion, and a set of support arms, all of which connected to form a single-piece structure.

Referring to FIG. 10, there is illustrated an example of a monolithic braille pin unit 88 for use in, but shown separately from, a braille cell 20 having an upper cover 26 with a set of apertures 28 therein, such as the one shown in FIGS. 2 to 7. It will be appreciated that any features and variants described above with respect to components of the monolithic braille pin units 88a, 88b in FIGS. 2 to 7, including the braille pins 22, the first and second common base portions 86a, 86b and the support arm 36, can be applied to corresponding components of the monolithic braille pin unit 88 in FIG. 10 and shall not be repeated in detail hereinbelow.

The monolithic braille pin unit 88 generally includes a set of braille pins 22 extending along a longitudinal pin axis 30; a base portion 86 configured for connection to the frame 24 of the braille cell 20, for example to the inner face 50 of the upper cover 26; and a set of support arms 36 holding the set of braille pins 22, for example a set of flexible cantilever arms. In some implementations, the base portion 86 can be releasably connectable to the frame 24 to enable or facilitate assembly and disassembly of the monolithic braille pin unit 88. Each braille pin 22 is engageable with a respective one of the apertures 28 and selectively movable therein along the longitudinal pin axis 30 between a raised position and a lowered position. Each support arm 36 has a base end 68 connected to the base portion 86 and a pin end 70 connected to and following a motion of a respective one of the braille pins 22 as the respective braille pin 22 is moved between the raised and lowered positions. In some implementations, the support arms 36 can extend substantially parallel to one another and substantially perpendicular to the braille pins 22. The support arms 36 can also include a curved or otherwise non-straight portion 72 (e.g., a convex upward profile) to obtain specified, desired or required mechanical properties. For example, the provision of a curved portion 72 can provide the support arms 36 with a certain degree of flexibility without adversely compromising their mechanical strength and structural integrity, and thus their ability to support the braille pins 22 without breaking or sustaining damage.

Figure 11:
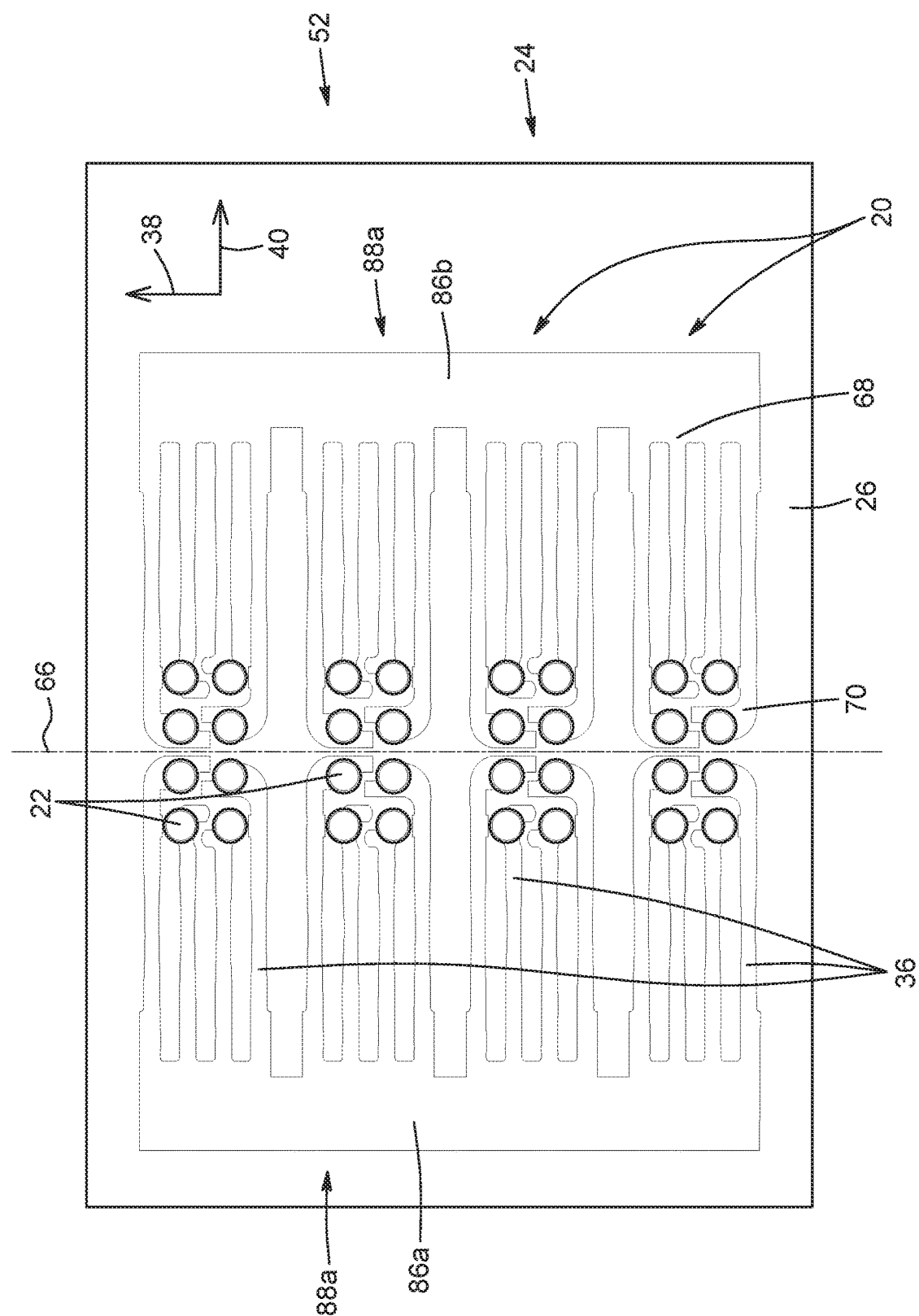
FIG. 11 is a schematic representation of a possible embodiment of a braille cell assembly including a linear array of four adjacent braille cells and two monolithic braille pin units disposed on opposite sides of the braille cell assembly.

In some implementations, a monolithic braille pin unit including braille pins and support arms that belong to more than one braille cell can be provided. For example, referring to FIG. 11, there is illustrated a schematic representation of braille cell assembly 52 including a linear array of four adjacent braille cells 20 and two monolithic braille pin units 88a, 88b. It is to be noted that the upper cover 26 of the frame 24 is shown in transparency in FIG. 11 to better illustrate the components of the monolithic braille pin units 88a, 88b. Each braille cell 20 includes eight braille pins 22 arranged in a rectangular 4×2 braille pin array of four rows, parallel to a row axis 38, and two columns, parallel to a column axis 40. Each monolithic braille pin unit 88a, 88b includes a base portion 86a, 86b configured to be connected to the upper cover 26 of the frame 24 of the braille cell assembly 52. Each monolithic braille pin unit 88a, 88b also includes four braille pins 22 and four support arms 36 for each braille cell 20, for a total of sixteen braille pins 22 and sixteen support arms 36. Each support arm 36 has a base end 68 connected to the base portion 86a, 86b and a pin end 70 connected to a respective one of the braille pins 22. The first monolithic braille pin unit 88a includes the braille pins 22 located in the two top rows of each braille cell 20, while the second monolithic braille pin unit 88b includes the braille pins 22 located in the two bottom rows of each braille cell 20. In some implementations, the first and second monolithic braille pin units 88a, 88b can be disposed in a mirror-symmetrical arrangement to each other relative to a mirror plane 66 perpendicular to the column axis 40 and passing centrally through the braille pin array (i.e., centrally between the pair of top rows and the pair of bottom rows).

Pin Actuation Unit Implementations

The structure, functionality and operation of various possible implementations of a braille pin actuation assembly based on rotary cams driven by electric motors are described below.

Referring to FIGS. 2 to 7, the braille cell 20 includes a pin actuation assembly 32 configured to individually project and retract each braille pin 22 between its extended and recessed positions. In the illustrated embodiment, the pin actuation assembly 32 includes four pin actuation units 54, each of which for selectively actuating two respective braille pins 22.

It should be noted, however, that the present techniques are not limited to dual-cam pin actuation units and that other embodiments can include pin actuation units that drive a single braille pin (single-cam pin actuation units) or more than two braille pins (multi-cam pin actuation units). Also, depending on the application, the pin actuation units of the pin actuation assembly may, but need not, all drive the same number of braille pins.

As noted above, the four pin actuation units 54 in FIGS. 2 to 7 are arranged below the upper cover 26 of the frame 24 in two mirror-symmetrically disposed vertical stacks 64a, 64b of two braille pins 22 each, although other arrangements can be used in other embodiments. Each pin actuation unit 54 in FIGS. 2 to 7 generally includes a motor 56 having a motor shaft 58 rotatable about a motor axis 60, a pair of cams 62 mounted on the motor shaft 58, and an angular position sensing system 90. These and other possible components of the pin actuation units 54 will now be described.

Figure 12A:
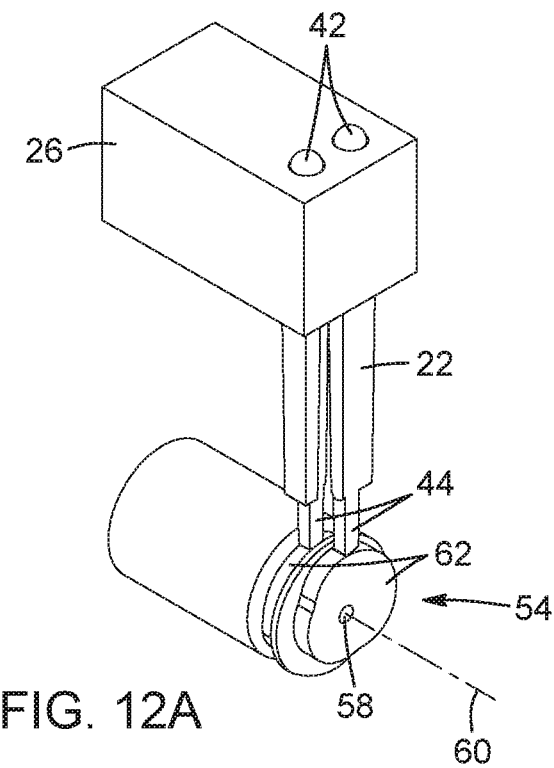
FIGS. 12A to 12D are schematic views of a possible embodiment of a pin actuation unit depicted in four different operating positions, corresponding to four different angular positions of the motor shaft about the motor axis. Each operating position corresponds to one of four distinct braille pin configurations, each braille pin configuration representing a different arrangement of the two braille pins actuated by the pin actuation unit in the raised and lowered positions thereof. The four braille pin configurations of the pair of braille pins over a full rotation of the motor shaft are as follows: "up" and "up" (FIG. 12A); "up" and "down" (FIG. 12B); "down" and "down" (FIG. 12C); and "down" and "up" (FIG. 12D).
Figure 12B:
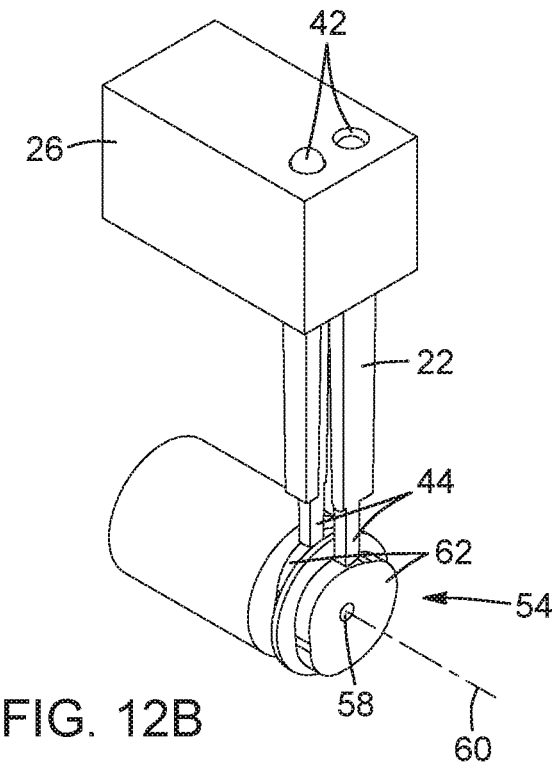
Figure 12C:
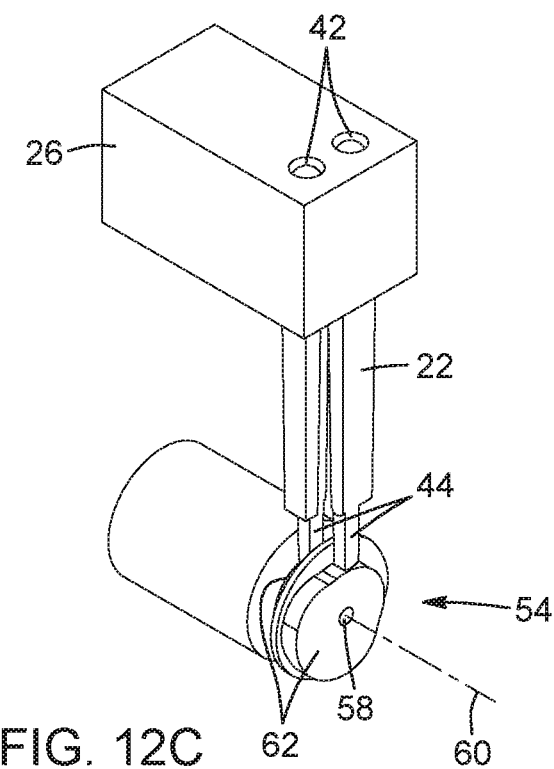
Figure 12D:
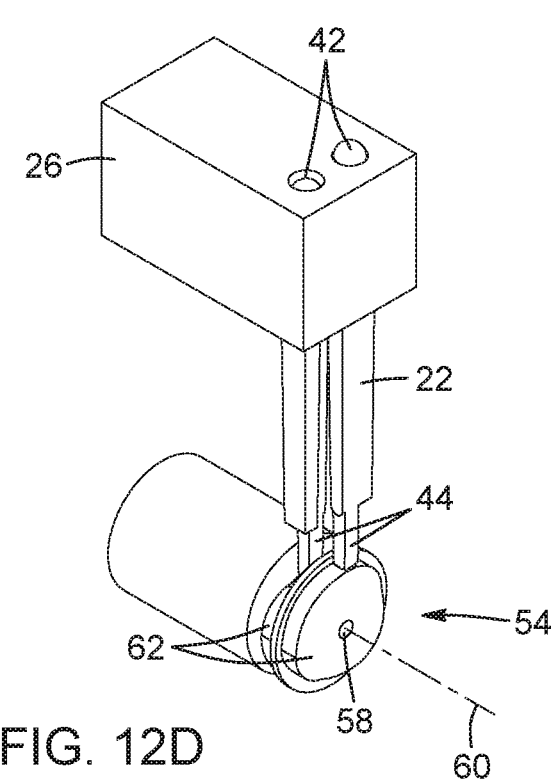

Referring to FIGS. 12A to 12D, there are illustrated schematic views of a pin actuation unit 54 in four different operating positions, which correspond to four different angular positions of the motor shaft 58 about the motor axis 60. In each operating position, each cam 62 of the pin actuation unit 54 is engaged with a respective one of the braille pins 22 at the bottom end 44 thereof to selectively move the braille pin 22 between its raised and lowered positions as the motor shaft 58 rotates about the motor axis 60. The two cams 62 are shaped and oriented relative to each other so that upon clockwise rotation of the motor shaft 58, the two associated braille pins 22 are sequentially moved up and down through a series of four (i.e., $2^2=4$) distinct braille pin configurations. Each braille pin configuration represents a different arrangement of the two braille pins 22 in the raised and lowered positions thereof. Each braille pin configuration is maintained over a range of angular positions of the motor 56 before switching to the next braille pin configuration, also over a finite angular range. More particularly, the four braille pin configurations of the pair of braille pins 22 over a full rotation of the motor shaft 58 about the motor axis 60 depicted in FIGS. 12A to 12D are as follows: (1) "up" and "up" (FIG. 12A); (2) "up" and "down" (FIG. 12B); (3) "down" and "down" (FIG. 12C); and (4) "down" and "up" (FIG. 12D).

It is appreciated that in other embodiments, the same sequence of four braille pin configurations over a full rotation of the motor shaft 58 about the motor axis 60 can be achieved through counterclockwise rotation of the motor shaft 58. Furthermore, in some embodiments, the motor shaft 58 may be rotated in either direction to provide the shortest rotational path to reach a given braille pin configuration.

It is also appreciated that, in general, if each pin actuation unit includes a set of N cams to selectively actuate N braille pins, the associated set of N cams should be mounted on the motor shaft to provide $2^N$ distinct braille pin configurations, each braille pin configuration being associated with a respective angular position of the motor shaft about its axis.

Returning to FIGS. 2 to 7, the motor 56 of each pin actuation unit 54 can be connected to a motor controller 110, for example via a printed circuit board (PCB) formed on the middle section 108 of the frame 24 of the braille cell 20. As such, the operation of each motor 56 can be individually controlled by electrical signals received from the motor controller 110 and representing braille characters that correspond to different combinations of raised and lowered braille pins 22. The motor controller 110 can be coupled to and receive instructions from a main processor of the device housing the braille cell 20.

The motor 56 can be a stepper motor operating at a certain number of steps per revolution, generally equal to an integer multiple of the number of distinct braille pin configurations. For example, in some implementation, a stepper motor having 20 steps per revolution can be used, corresponding to a step angle of 18°. In such a case, the four braille pin configurations of the embodiment of FIGS. 2 to 7 would be associated with four rest or central angular positions of the motor shaft 58, separated from one another by five motor steps (i.e., 18°/step×5 steps=90°). As used herein, the rest angular position associated with a certain braille pin configuration is the angular position of the motor shaft corresponding to the midpoint of the angular range over which the braille pin configuration is maintained before switching to, or after switching from, another braille pin configuration. It should be noted that the present techniques are not limited to stepper motors and that other embodiments can use other types of electric motors.

Figure 13B:
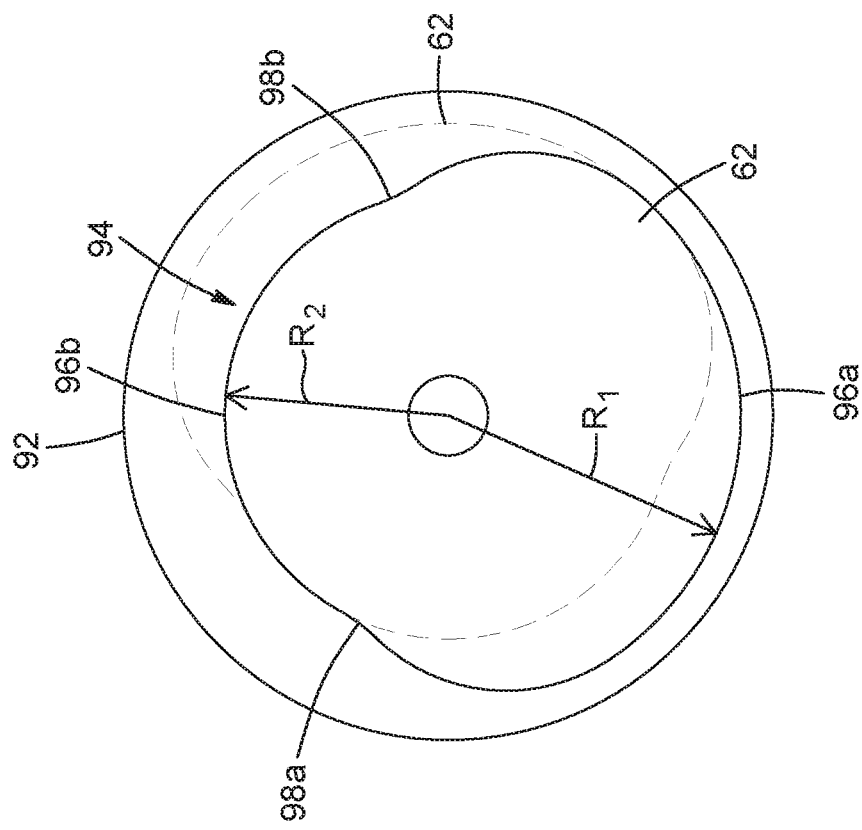
FIGS. 13A and 13B are an isolated perspective view (FIG. 13A) and an isolated front elevation view (FIG. 13A) of one of the four sets of two cams of the braille cell of FIGS. 2 to 7.
Figure 13A:
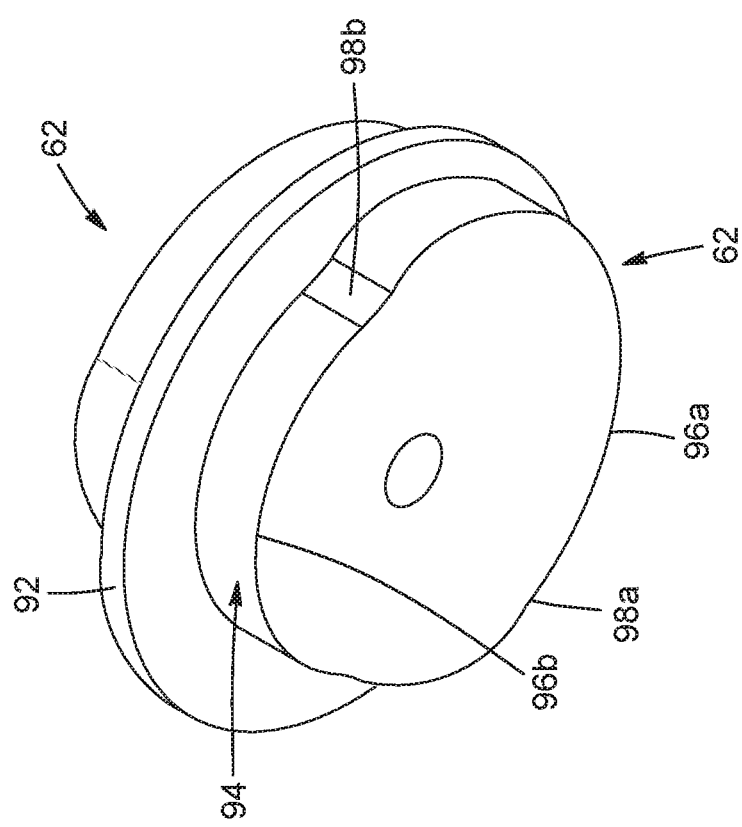

Referring still to FIGS. 2 to 7, and further to FIGS. 13A and 13B, more detail will be provided about the cams 62. FIGS. 13A and 13B are respectively isolated perspective and front views of one of the four sets of two cams 62 of the braille cell of FIGS. 2 to 7. In this case, the two cams 62 and a thin circular plate 92 extending therebetween form an integral structure to be mounted on the motor shaft. The provision of the thin circular plate 92 can prevent or help prevent interference between the motion of the two braille pins 22 actuated by the two cams 62. It is appreciated that in other embodiments, the two cams 62 could be provided as separate structures. Each cam 62 has a cam surface 94 that engages the bottom end 44 of the respective braille pin 22. The cam surface 94 defines a cam profile selected to allow the respective braille pin 22 to be actuated between a raised position, where the braille pin 22 extends above the outer face 48 of the upper cover 26 and partly out of its respective aperture 28, and a lowered position, where the braille pin 22 retreats below the outer face 48 and inside the aperture 28. In some implementations, the cam surface 94 and/or the bottom end 44 of the braille pin 22 can be shaped to provide a smooth contact surface therebetween to facilitate actuation of the braille pins 22.

In the illustrated embodiment, the two cams 62 of each pin actuation unit 54 have identical cam profiles oriented at right angles to each other, so that their up and down positions are angularly spaced by 90° from each other. As noted above, the four braille pin configurations (see FIGS. 12A to 12D) associated with each pin actuation unit 54 correspond to four angular positions of the motor shaft 58 spaced by 90°. In FIGS. 13A and 13B, each cam 62 has a generally pear-shaped profile that includes a first convex arc segment 96a having a first radius $R_1$ selected to bring the braille pin to its raised position, a second convex arc segment 96b having a second radius $R_2<R_1$ selected to bring the braille pin to its lowered position, and two transition segments 98a, 98b connecting the first and second convex arc segments 96a, 96b to each other and along which the braille pin switches between its raised and lowered positions. It is appreciated that the cam profile depicted in FIGS. 13A and 13B is provided for illustrative purposes only and that the present techniques can be implemented using various types of symmetrical or non-symmetrical cam profiles. For example, the cam profiles can be centered or eccentric with respect to the motor shaft, and they can include straight and/or curved portions and convex and/or concave contours.

Furthermore, depending on the application, the profiles of cams belonging to the same pin actuation unit may or may not be the same, and likewise for the profiles of cams belonging to different pin actuation units. It should also be noted that in the illustrated embodiment, each cam engages its associated braille pin from below and is configured, upon rotation, to push the braille pin upward against gravity to bring it to its raised position and, upon further rotation, to let the braille pin to return by gravity to its lowered position. However, in other embodiments, the cam could alternatively be configured to engage the braille pins from above to push them down from their raised to their lowered position against some restoring force that would tend to return the braille pins to their raised position.

Returning to FIGS. 2 to 7, and more particularly to FIGS. 5 and 6, the pin actuation unit 54 includes an angular position sensing system 90, or rotary encoder, configured to monitor the angular position of the motor shaft 58 as the motor shaft 58 rotates about the motor axis 60. From this monitoring, the angular position sensing system 90 is configured to generate an output signal indicative of the passage of the motor shaft 58 through one or more reference angular positions during its rotational motion. For example, the output signal can be an electrical signal that varies with time, in a way that relates to the rotational motion of the motor shaft 58 about the motor axis 60. The output signal can be processed to determine a current angular position of the motor shaft 58 and, therefrom, a current braille pin configuration of the associated set of braille pins. For example, when the motor 56 is a stepper motor, the output signal produced by the angular position sensing system 90 can be used to determine the current step position of the motor shaft 58 and deduce, from a knowledge of a mapping between motor step positions and braille pin configurations, the current braille pin configuration. It is appreciated that the one or more reference angular positions (e.g., one or more of the step positions of a stepper motor) may, but need not, correspond to one of the rest angular positions of the motor shaft 58 associated with the braille pin configurations. In some implementations, using reference angular positions that do not correspond to rest angular positions can be advantageous because such reference angular positions correspond to position where the motor shaft 58 is rotating, rather than at rest. For example, in some scenarios, if the motor shaft 58 is found to be desynchronized, having the motor shaft 58 already in movement may facilitate its resynchronization. The angular position sensing system 90 can transmit a signal conveying information associated with the determined current angular position of the motor shaft 58 to a motor controller 110 coupled to the motor shaft 58 and configured to control its operation. The motor controller 110 may then initialize, verify, update, or correct its operation based on the received signal.

Depending on the application, the process of monitoring the motor shaft to determine its current angular position can be performed at the start of utilization and/or during utilization of the braille cell (or the refreshable braille display including the braille cell). Such monitoring can ensure or verify that the pin actuation unit including the motor shaft operates correctly, that is, that the current angular position of the motor shaft stored in memory matches the actual current angular position of the motor shaft, as determined by the angular position sensing system.

When monitoring is performed at the initialization of the braille cell, the current (i.e., initial) angular position of the motor shaft determined by the angular position sensing system is communicated to and stored in memory by the motor controller before the motor controller initiates transmission of control signals to the motor shaft to actuate the braille pins.

When monitoring is performed during operation of the braille cell, either intermittently, at regular time intervals or not, or continuously, the current angular position of the motor shaft determined by the angular position sensing system is compared, in real-time or near real-time, to the value stored in the motor controller memory. If a mismatch is found, the current angular position of the motor shaft as determined by the angular position sensing system can be used to update, rectify or otherwise adjust the value stored in the motor controller memory. An exemplary scenario where the motor controller may lose track of the angular position of the motor shaft can occur when a user presses a braille pin with an excessive force that causes the braille pin to be unwantedly retracted into its lowered position.

Depending on the application, the angular position sensing system may employ or be based on a variety of rotary mechanisms or rotary encoding techniques that enable monitoring or tracking the angular position of the motor shaft in the context of the present techniques. Moreover, the angular position sensing system can use various technological approaches and principles including, but not limited to, one or more of the following: magnetic, optical, mechanical contact (e.g., stopper-based), capacitive, and inductive.

In some implementations, the angular position sensing system can include a modulator configured to provide a modulated signal that varies as a function of the rotation angle of the motor shaft about the motor axis, and a receiver configured to receive the modulated signal. The modulator may be coupled to the motor shaft to rotate along with the motor shaft and relative to the receiver. In some scenarios, the angular position sensing system may also include a transmitter that generates a source signal, which is modulated by the modulator before reception by the receiver. For example, in the case of an optical-based approach, the transmitter may be an optical source, and the receiver may be an optical detector, both fixedly mounted to the frame. The modulator may be an optical pattern coupled to rotate along with the motor shaft. The optical source may emit an input light signal onto the rotating optical pattern which, in response, generates a reflected, transmitted or scattered modulated signal having an optical parameter that varies with the rotation angle of the motor shaft. The modulated signal is detected by the optical detector and contains information about the angular position of the motor shaft.

In other scenarios, the angular position sensing system may not require a separate transmitter, for example when the modulator itself acts as the source of the modulated signal. For example, in the case of a magnetic-based approach, the modulator may be a magnet mounted on the rotating motor shaft and the receiver may be a magnetic field sensor. The magnet produces a magnetic field having a spatially dependent intensity and/or direction, and the magnetic field sensor measures variations in the magnetic field induced by the rotating magnet, the variations being in accordance with the angular position of the motor shaft. In other embodiments, it may also be envisioned for the magnet to be at rest and the magnetic field sensor to be mounted on the rotating motor shaft.

FIGS. 14A and 14B and FIGS. 15A and 15B illustrate two possible examples of magnetic-based implementations of an angular position sensing system 90 of a pin actuation unit 54 for actuating a pair of braille pins 22. In both cases, the angular position sensing system 90 includes a modulator 100 including at least one magnet 102, a receiver 104 embodied by a magnetic field sensor, and a processor 106. In addition to the angular position sensing system 90, the pin actuation unit 54 includes a motor 56 having a motor shaft 58 rotatable about a motor axis 60 and a pair of cams 62 mounted on the motor shaft 58 and engaging the pair of braille pins 22 for actuating the same. The motor shaft 58 is further connected to a motor controller 110, which is itself connected to the processor 106.

Figure 14A:
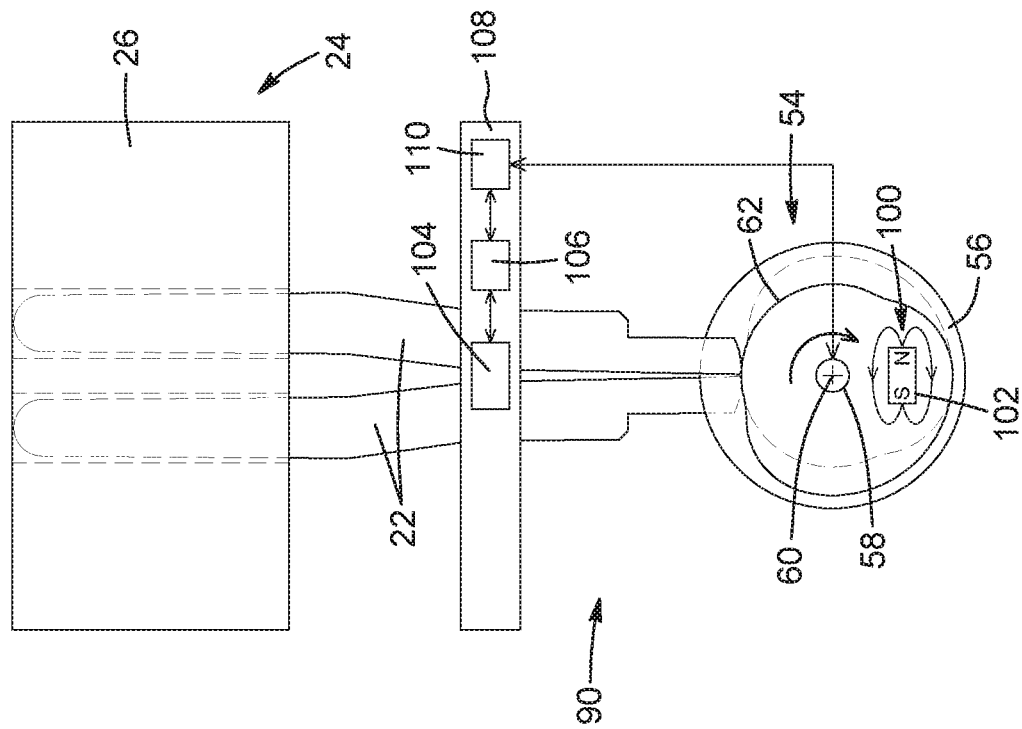
FIGS. 14A and 14B show an example of a single-magnet implementation of an angular position sensing system of a pin actuation unit, depicted in two different operating positions as follows: the magnet and magnetic field sensor azimuthally aligned with each other (FIG. 14A); and the magnet and magnetic field sensor azimuthally offset from each other (FIG. 14B).
Figure 14B:
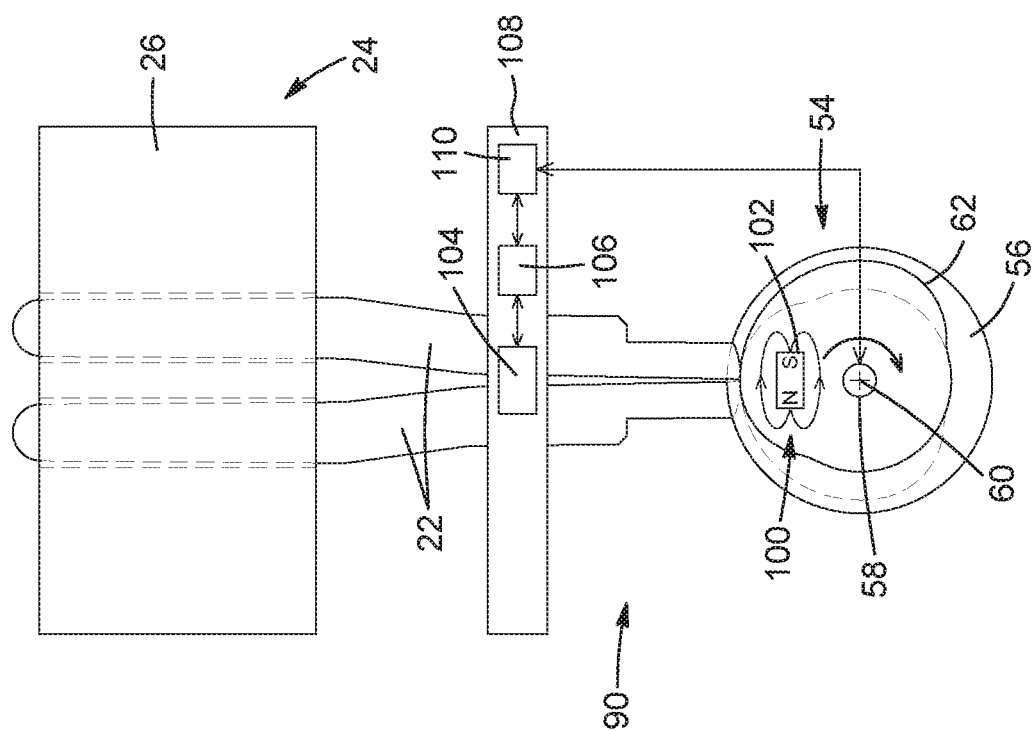

Referring to FIGS. 14A and 14B, the modulator 100 includes a magnet 102 mounted to one of the cams 62, in a radially offset relationship with the motor axis 60. More specifically, in the illustrated embodiment, the magnet 102 is mounted inside a complementary shaped cavity formed in the cam 62. The magnet 102 can be embodied by a permanent magnet, a ferromagnetic metal, an electromagnet or another suitable source of magnetic field. In FIGS. 14A and 14B, the magnet 102 is an elongated permanent magnet extending between a north pole end "N" and a south pole end "S" along a direction generally tangent to its rotation path about the motor axis 60. The magnet 102 produces, as the modulated signal, a spatially varying magnetic field having, at any point in space, an intensity and a direction.

The receiver 104 is a magnetic field sensor mounted on a PCB formed on the frame 24 of the braille cell 20, in a spaced relationship from the magnet 102. In FIGS. 14A and 14B, the receiver 104 is mounted to a middle section 108 of the frame 24 (i.e., between the lower and upper rows of pin actuation units 54; see FIG. 2), above and in vertical alignment with the motor shaft 58. In the illustrated embodiment, the middle section 108 of the frame 24 forms a PCB. This configuration is provided by way of example only, and various other configurations are possible in other embodiments. The receiver 104 senses the magnetic field produced by the magnet 102 during at least part of the rotational motion of the motor shaft 58, the magnetic field varying with time in accordance with the angular position of the rotating motor shaft 58. In response, the receiver 104 generates an output signal from which information about the current angular position of the motor shaft 58 can be determined. For example, the output signal can convey information indicative of the passage or presence of the magnet 102, at a given instant, through a reference angular position. In FIGS. 14A and 14B, the reference angular position corresponds to the point of closest approach between the magnet 102 and the receiver 104, which is reached in FIG. 14A, but other reference angular positions could be used. As noted above, the one or more reference angular positions may, but need not, correspond to a rest angular position of the motor shaft 58. For example, in some implementations, the or each reference angular position may be located at a midpoint between two adjacent rest angular positions. Based on the output signal received from the magnet 102, the processor 106 may be configured to transmit a processed signal conveying the information associated with the current angular position of the motor shaft 58 to the motor controller 110 coupled to the motor shaft 58. In turn, the motor controller 110 may be configured to rectify, adjust, or otherwise control the rotational motion of the motor shaft 58 based on the processed signal received from the processor 106.

In some implementations, the magnetic field sensor can be a Hall effect sensor, although a variety of other types of magnetic field sensors instead of, or combined with, a Hall effect sensor can be used in other implementations. Non-limiting examples include anisotropic magnetoresistance sensors, giant magnetoresistance sensors, giant magneto-impedance sensors, magnetometers, inductive coils, flux-gates, and eddy current probes. The output signal produced by a Hall effect sensor is an electrical signal—usually a voltage—that varies with time in accordance with temporal variations in the intensity of the measured magnetic field. The general principles underlying the structure and operation of Hall effect sensors, and their application in angular position sensing devices, are known in the art and need not be covered in detail herein.

The output signal produced by the receiver 104 is transmitted to the processor 106. The processor 106 can determine the current angular position of the motor shaft 58 based on the output signal. The processor 106 can be embodied by a microprocessor, a microcontroller, a central processing unit (CPU), a processing core, or any suitable computing or computational device. The processor 106 may be configured to execute code and instructions, which can be stored in a memory or a similar device. The processor 106 may be connected to the receiver 104 via printed circuit boards. The processor 106 can determine the current angular position of the motor shaft 58 from the output signal received from the receiver 104 using various methods. Possible methods can involve identifying specified features in the output signal, for example a peak or a dip, or comparing the output signal to calibrated or reference data stored in a memory. It should be noted that, in the present techniques, the output signal produced by the receiver 104 may, but need not, be indicative of the angular position of the motor shaft 58 at all times. That is, in some implementations, the receiver 104 may not provide continuous measurement of the angular position of the motor shaft 58. In such implementations, the receiver 104 may be limited to determine the presence (see FIG. 14A) or absence (see FIG. 14B) of the magnet 102, which means that the output signal is a simple on/off binary signal. For example, the information conveyed by the output signal may be limited to an indication of the passage, at a given time, of the magnet 102 through a reference angular position. In such a case, the receiver 104 may be configured to deliver, as the output signal, a match signal to the processor 106 only upon detection of the presence of the magnet 102 in front of it.

Figure 15B:
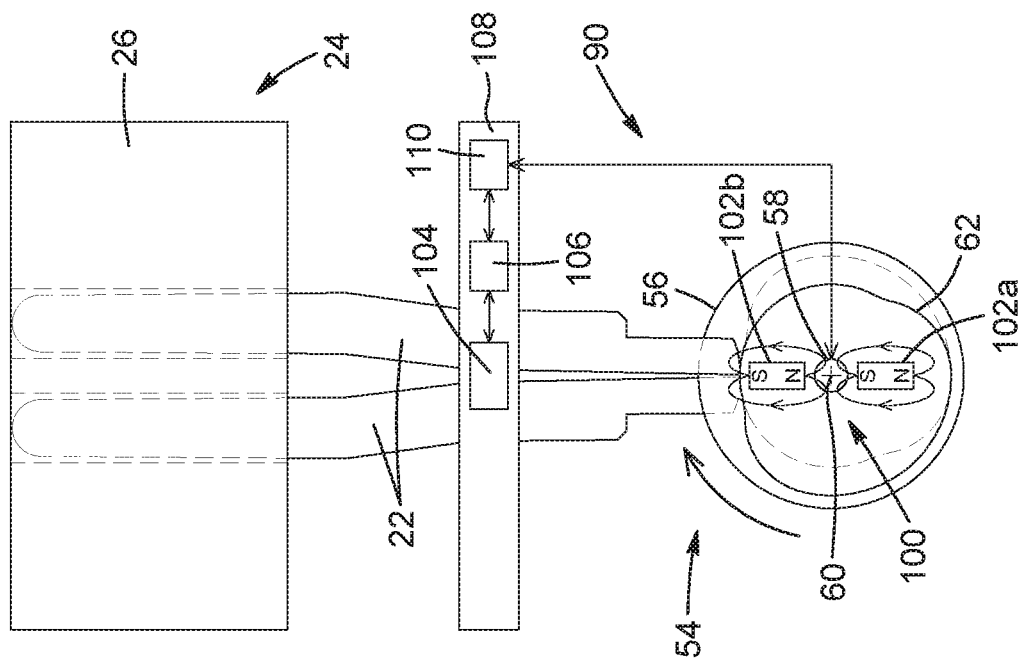
FIGS. 15A and 15B show an example of a two-magnet implementation of an angular position sensing system of a pin actuation unit, depicted in two different operating positions as follows: the first magnet and second magnet respectively azimuthally aligned with and offset from the magnetic field sensor (FIG. 15A); and the first magnet and second magnet respectively azimuthally offset from and aligned with the magnetic field sensor (FIG. 15B).
Figure 15A:
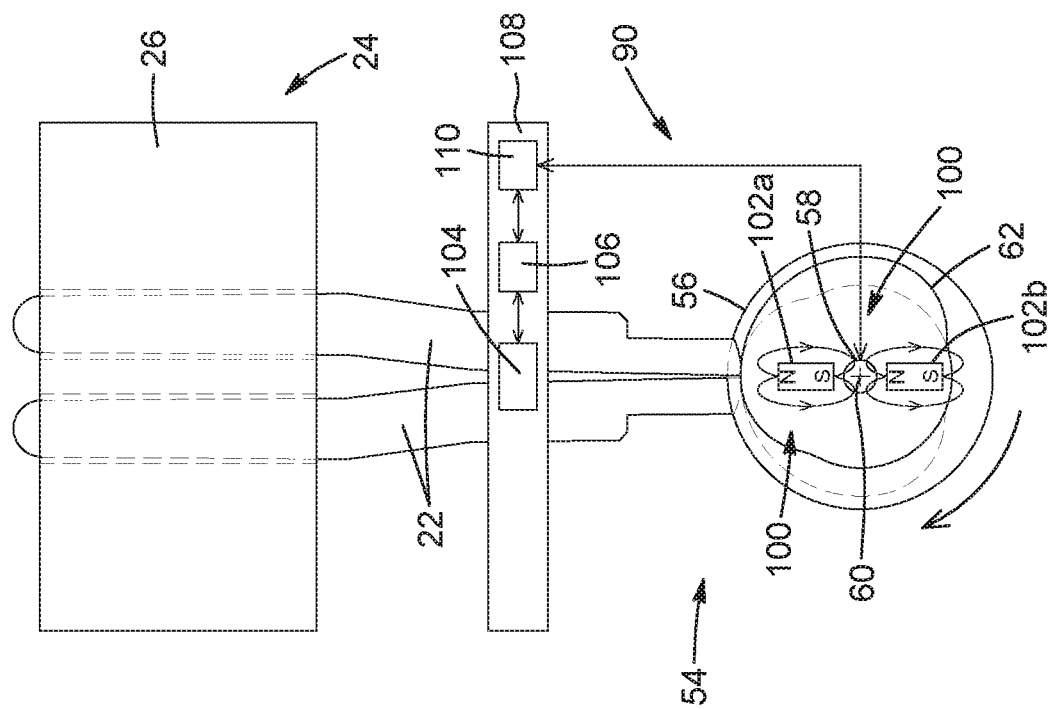

Referring to FIGS. 15A and 15B, the illustrated angular position sensing system 90 shares many features with that of FIGS. 14A and 14B, and these features will not be described again in detail. The angular position sensing system 90 of FIGS. 15A and 15B differs from that of FIGS. 14A and 14B in that it includes two magnets 102a, 102b mounted in the cam 62, instead of one. Each one of the magnets 102a, 102b is an elongated permanent magnet extending between a north pole end "N" and a south pole end "S", generally along a radial direction with respect to the motor axis 60. Furthermore, the two magnets 102a, 102b are disposed in a diametrically opposed relationship with respect to the motor axis 60. The magnetization of the first magnet 102a points radially outward and the magnetization of the second magnet 102b points radially inwardly. That is, the two magnets 102a, 102b have opposite poles facing each other, with the north pole "N" of the first magnet 102a being radially outward from the south pole "S", and the north pole "N" of the second magnet 102b being radially inward from the south pole "S".

In this configuration, the presence of the first magnet 102a in front of the receiver 104, depicted in FIG. 15A, will yield a first output signal. Meanwhile, the presence of the second magnet 102b in front of the receiver 104, depicted in FIG. 15B, will yield a second output signal. The first and second output signals will usually have opposed characteristics or features due to the magnets 102a, 102b being magnetized radially outward and inward, respectively. For example, the presence of the first magnet 102a may be detected as a peak in the response of the receiver 104, while the presence of the second magnet 102b may be detected as a dip in the response of the receiver 104, or vice versa. Furthermore, in this configuration, the presence of the first magnet 102a may only be detected by the receiver 104 if the last magnet that passed in front of the receiver 104 was the second magnet 102b, and vice versa. This means that the implementation of the angular position sensing system 90 in FIGS. 15A and 15B, the receiver 104 is configured to alternate between detecting the presence of the first magnet 102a and detecting the presence of the second magnet 102b, but not to perform successive detections of a same magnet due to saturation and hysteresis effects. Such a configuration can be advantageous in that it can provide more input data to the receiver 104.

It is appreciated that the magnet arrangements shown in FIGS. 14A and 14B and FIGS. 15A and 15B are provided for illustrative purposes only, and that the magnet number, type, and configuration can be varied depending on the application to allow a determination of a current or initial angular position of the motor shaft about its axis.

Various non-limiting examples of embodiments and implementations have been described and illustrated herein. It is appreciated that features of embodiments and implementations described could be combined with other features of embodiments and implementations described to provide still other variations within the scope of the present disclosure. For example, the pin support arm implementations, the pin actuation unit implementations including stacked dual-cam pin actuation units, and the pin actuation unit implementations including an angular position sensing system can be implemented in a braille cell alone or in any combination thereof. Accordingly, numerous modifications could be made thereto the specific embodiments and implementations described above without departing from the scope of the appended claims.

The invention claimed is:

1. A braille cell comprising:
a frame including an upper cover having a plurality of apertures therein;
a plurality of braille pins, each braille pin extending along a longitudinal pin axis and being engaged with a respective one of the apertures and movable therein along the longitudinal pin axis between a raised position and a lowered position thereof;
a pin actuation assembly configured to move each braille pin between the raised position and the lowered position thereof; and
a pin support assembly including a plurality of support arms holding the plurality of braille pins, each support arm having a base end connected to the frame and a pin end connected to and following a motion of a respective one of the braille pins as the respective braille pin is moved between the raised and lowered positions thereof by the pin actuation assembly, wherein the support arms are releasably connected to the frame.

2. The braille cell of claim 1, wherein the plurality of support arms comprises flexible cantilever arms.

3. The braille cell of claim 1, wherein at least one of the support arms comprises a curved portion.

4. The braille cell of claim 1, wherein the support arms are arranged in sets, the support arms in each set have the base ends thereof terminating in a common base portion connected to the frame, and each set of support arms and the respective braille pins held thereby together define one of a number of monolithic braille pin units.

5. The braille cell of claim 1, wherein:
the plurality of braille pins consists of eight braille pins arranged in a rectangular braille pin array of four rows parallel to a row axis and two columns parallel to a column axis, and the plurality of support arms consists of eight corresponding support arms;
the four rows consist of a first row, a second row adjacent to the first row, a third row adjacent to the second row, and a fourth row adjacent to the third row, wherein the plurality of support arms consists of a first set of four support arms holding the four braille pins of the first row and the second row, and a second set of four support arms holding the braille pins of the third row and the fourth row;
the support arms of the first set have the base ends thereof terminating in a first common base portion connected to the frame, the support arms of the first set and the respective braille pins held thereby together defining a first monolithic braille pin unit; and
the support arms of the second set have the base ends thereof terminating in a second common base portion connected to the frame, the support arms of the second set and the respective braille pins held thereby together defining a second monolithic braille pin unit.

6. The braille cell of claim 1, wherein the pin actuation assembly includes a pin actuation unit for actuating a subset of braille pins among the plurality of braille pins, each pin actuation unit comprising:
a motor having a motor shaft configured to rotate about a motor axis; and
a set of cams mounted on the motor shaft, each cam being engaged with a respective one of the braille pins in the respective set to selectively move the respective braille pin between the raised position and the lowered position thereof, the cams being oriented relative to one another so that upon rotation of the motor shaft the braille pins are sequentially raised and lowered into a series of distinct braille pin configurations, each braille pin configuration representing a different arrangement of the braille pins in the raised and lowered positions thereof.

7. The braille cell of claim 6, further comprising an angular position sensing system configured to monitor a rotational motion of the motor shaft about the motor axis and generate an output signal indicative of a passage of the motor shaft through a reference angular position during the rotational motion thereof.

8. A pin actuation unit for actuating a set of braille pins, the pin actuation unit comprising:
a motor having a motor shaft configured to rotate about a motor axis;
a set of cams mounted on the motor shaft, each cam being engaged with a respective one of the braille pins to move the respective braille pin between a raised position and a lowered position thereof, the cams being oriented relative to one another so that upon rotation of the motor shaft the braille pins are sequentially raised and lowered into a series of distinct braille pin configurations, each braille pin configuration representing a different arrangement of the braille pins in the raised and lowered positions thereof; and
an angular position sensing system configured to monitor a rotational motion of the motor shaft about the motor axis and generate an output signal indicative of a passage of the motor shaft through a reference angular position during the rotational motion thereof.

9. The pin actuation unit of claim 8, wherein the set of cams consists of two cams and the series of distinct braille pin configurations consists of four distinct braille pin configurations.

10. The pin actuation unit of claim 8, wherein the two cams are oriented at right angle to each other on the motor shaft.

11. The pin actuation unit of claim 8, wherein the motor is a stepper motor.

12. The pin actuation unit of claim 8, wherein the angular position sensing system comprises a modulator configured to provide a modulated signal that varies as a function of a rotation angle of the motor shaft about the motor axis, and a receiver configured to receive the modulated signal and produce therefrom the output signal.

13. The pin actuation unit of claim 12, wherein the angular position sensing system comprises a processor configured to receive the output signal from the receiver, determine therefrom information associated with a current angular position of the motor shaft, and transmit a processed signal conveying the information associated with the current angular position of the motor shaft to control the rotational motion thereof.

14. The pin actuation unit of claim 13, wherein the processor is configured to derive information associated with a current braille pin configuration of the set of braille pins among the series of distinct braille pin configurations based on the information associated with the current angular position of the motor shaft.

15. The pin actuation unit of claim 12, wherein the modulator comprises at least one magnet producing a spatially varying magnetic field as the modulated signal, and the receiver comprises a magnetic field sensor configured to sense an intensity of the spatially varying magnetic field produced by the at least one magnet during at least part of the rotational motion of the motor shaft and to generate, in response, the output signal.

16. The pin actuation unit of claim 15, wherein each magnet is mounted to one of the cams in a radially offset relationship with the motor axis.

17. The pin actuation unit of claim 15, wherein the at least one magnet consists of either a single magnet or a pair of magnets.

18. The pin actuation unit of claim 17, wherein the at least one magnet consists of two magnets disposed in a diametrically opposed relationship with respect to the motor axis and with opposite poles facing each other.

19. The pin actuation unit of claim 15, wherein the magnetic field sensor is a Hall effect sensor.

20. A braille cell comprising:
a frame including an upper cover having a plurality of apertures therein;
a plurality of braille pins, each braille pin extending along a longitudinal pin axis and being engaged with a respective one of the apertures and movable therein along the longitudinal pin axis between a raised position and a lowered position thereof; and
a pin actuation assembly including pin actuation units, each pin actuation unit for actuating a respective set of braille pins among the plurality of braille pins, each pin actuation unit comprising:
a motor having a motor shaft configured to rotate about a motor axis;
a set of cams mounted on the motor shaft, each cam being engaged with a respective one of the braille pins in the respective set to move the respective braille pin between the raised position and the lowered position, the cams being oriented relative to one another so that upon rotation of the motor shaft the braille pins are sequentially raised and lowered into a series of distinct braille pin configurations, each braille pin configuration representing a different arrangement of the braille pins in the raised and lowered positions thereof; and
an angular position sensing system configured to monitor a rotational motion of the motor shaft about the motor axis and generate an output signal indicative of a passage of the motor shaft through a reference angular position during the rotational motion thereof.

21. The braille cell of claim 20, wherein the pin actuation units consist of four pin actuation units.

22. The braille cell of claim 21, wherein, for each pin actuation unit, the respective set of braille pins is a respective pair of braille pins, the respective set of cams consists of two cams, and the series of distinct braille pin configurations consists of four distinct braille pin configurations.

23. The braille cell of claim 21, wherein the four pin actuation units are arranged in a first stack and a second stack of two pin actuation units.

24. The braille cell of claim 20, wherein the angular position sensing system comprises a modulator configured to provide a modulated signal that varies as a function of a rotation angle of the motor shaft about the motor axis, and a receiver configured to receive the modulated signal and produce therefrom the output signal.

25. The braille cell of claim 24, wherein the modulator comprises at least one magnet producing a spatially varying magnetic field as the modulated signal, and the receiver comprises a magnetic field sensor configured to sense an intensity of the spatially varying magnetic field produced by the at least one magnet during at least part of the rotational motion of the motor shaft and to generate, in response, the output signal.

26. A braille cell comprising:
a frame including an upper cover having a plurality of apertures therein;
a plurality of braille pins, each braille pin extending along a longitudinal pin axis and being engaged with a respective one of the apertures and movable therein along the longitudinal pin axis between a raised position and a lowered position thereof;
a pin actuation assembly configured to move each braille pin between the raised position and the lowered position thereof, wherein the pin actuation assembly includes a pin actuation unit for actuating a subset of braille pins among the plurality of braille pins, the pin actuation unit comprising:
a motor having a motor shaft configured to rotate about a motor axis; and
a set of cams mounted on the motor shaft, each cam being engaged with a respective one of the braille pins in the respective set to selectively move the respective braille pin between the raised position and the lowered position thereof, the cams being oriented relative to one another so that upon rotation of the motor shaft the braille pins are sequentially raised and lowered into a series of distinct braille pin configurations, each braille pin configuration representing a different arrangement of the braille pins in the raised and lowered positions thereof;
a pin support assembly including a plurality of support arms holding the plurality of braille pins, each support arm having a base end connected to the frame and a pin end connected to and following a motion of a respective one of the braille pins as the respective braille pin is moved between the raised and lowered positions thereof by the pin actuation assembly; and an angular position sensing system configured to monitor a rotational motion of the motor shaft about the motor axis and generate an output signal indicative of a passage of the motor shaft through a reference angular position during the rotational motion thereof.

27. The braille cell of claim 26, wherein:

the plurality of braille pins consists of eight braille pins arranged in a rectangular braille pin array of four rows parallel to a row axis and two columns parallel to a column axis, and the plurality of support arms consists of eight corresponding support arms;

the four rows consist of a first row, a second row adjacent to the first row, a third row adjacent to the second row, and a fourth row adjacent to the third row, wherein the plurality of support arms consists of a first set of four support arms holding the four braille pins of the first row and the second row, and a second set of four support arms holding the braille pins of the third row and the fourth row;

the support arms of the first set have the base ends thereof terminating in a first common base portion connected to the frame, the support arms of the first set and the respective braille pins held thereby together defining a first monolithic braille pin unit; and the support arms of the second set have the base ends thereof terminating in a second common base portion connected to the frame, the support arms of the second set and the respective braille pins held thereby together defining a second monolithic braille pin unit.

* * * * *